(12) United States Patent
Prasad et al.

(10) Patent No.: US 8,050,291 B1
(45) Date of Patent: Nov. 1, 2011

(54) SYSTEM AND METHOD FOR INDOOR WIRELESS SERVICE DISTRIBUTION VIA ULTRA-WIDEBAND SIGNALS, AND AGGREGATION OF COMBINED DIGITAL SIGNALS FOR WIRELESS SERVICE

(75) Inventors: Sunil Prasad, Ashburn, VA (US); Janet Ruth Dianda, Ashburn, VA (US); John McCloskey, Kensington, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 844 days.

(21) Appl. No.: 11/838,756

(22) Filed: Aug. 14, 2007

(51) Int. Cl.
*H04J 3/16* (2006.01)
(52) U.S. Cl. .................. 370/467; 370/478; 370/482
(58) Field of Classification Search .......... 370/466, 370/395.62, 467, 478, 479, 482, 483, 498; 375/130, 259
See application file for complete search history.

(56) References Cited

U.S. PATENT DOCUMENTS

| | | | |
|---|---|---|---|
| 5,682,256 A | 10/1997 | Motley et al. | |
| 5,809,422 A | 9/1998 | Raleigh et al. | |
| 5,949,564 A | 9/1999 | Wake | |
| 6,154,443 A | 11/2000 | Huang et al. | |
| 6,525,855 B1 | 2/2003 | Westbrook et al. | |
| 6,781,981 B1 | 8/2004 | Kimbrough | |
| 6,782,048 B2 * | 8/2004 | Santhoff | 375/240 |
| 6,788,666 B1 | 9/2004 | Linebarger et al. | |
| 6,826,163 B2 | 11/2004 | Mani et al. | |
| 6,826,164 B2 | 11/2004 | Mani et al. | |
| 6,831,901 B2 | 12/2004 | Millar | |
| 6,963,552 B2 | 11/2005 | Sabat et al. | |
| 7,099,308 B2 | 8/2006 | Merrill et al. | |
| 7,236,509 B2 * | 6/2007 | Gerrits et al. | 375/130 |
| 7,349,478 B2 * | 3/2008 | Lakkis | 375/240.27 |
| 7,359,426 B2 * | 4/2008 | Ojard | 375/130 |
| 7,634,250 B1 | 12/2009 | Prasad et al. | |
| 2001/0036163 A1 | 11/2001 | Sabat et al. | |
| 2002/0186436 A1 | 12/2002 | Mani et al. | |
| 2002/0191565 A1 | 12/2002 | Mani et al. | |
| 2003/0016418 A1 | 1/2003 | Westbrook et al. | |
| 2003/0157943 A1 | 8/2003 | Sabat, Jr. | |
| 2004/0057393 A1 | 3/2004 | Bianchi et al. | |
| 2004/0198453 A1 | 10/2004 | Cutrer et al. | |
| 2004/0219897 A1 * | 11/2004 | Choi | 455/166.2 |
| 2005/0003769 A1 | 1/2005 | Foerster et al. | |
| 2005/0078699 A1 | 4/2005 | Cummings | |
| 2005/0147067 A1 | 7/2005 | Mani et al. | |

(Continued)

OTHER PUBLICATIONS

U.S. Appl. No. 11/689,808, filed Mar. 22, 2007.

(Continued)

*Primary Examiner* — Brenda Pham

(57) ABSTRACT

A method and system for communicating an ultra-wideband signal carrying a combined digital signal that represents digital signals for multiple communication channels of a wireless communication system. A distributed antenna system includes multiple remote antenna entities. Each remote antenna entity may include an ultra-wideband transceiver for sending or receiving the ultra-wideband signal. The multiple remote antenna entities may be spaced apart within an indoor premises so as to extend cell coverage of a base transceiver station. The ultra-wideband signal may be transmitted in a forward-link direction towards one or more wireless communication devices or in a reverse-link direction towards the base transceiver station. An aggregator within a remote antenna entity may aggregate multiple combined digital signals so as to form an aggregated combined digital signal that may be transmitted in a reverse-link direction towards the base transceiver station.

31 Claims, 6 Drawing Sheets

U.S. PATENT DOCUMENTS

| | | |
|---|---|---|
| 2005/0172198 A1 | 8/2005 | Millar |
| 2005/0226625 A1 | 10/2005 | Wake et al. |
| 2005/0243785 A1 | 11/2005 | Sabat et al. |
| 2005/0270221 A1 | 12/2005 | Fedotov et al. |
| 2005/0282536 A1 | 12/2005 | McClure et al. |
| 2006/0165155 A1 | 7/2006 | Liu et al. |
| 2009/0046593 A1 | 2/2009 | Ptasinski et al. |

OTHER PUBLICATIONS

U.S. Appl. No. 11/405,917, filed Apr. 18, 2006.

U.S. Appl. No. 11/378,998, filed Mar. 17, 2006.

Richard H. Blackwell, "Digital Sampling Power Analyzer for GSM and CDMA," Boonton Electronics, Mar. 31, 2004.

CDMA Technology, Multiple Access, downloaded from the World Wide Web at http://www.tsp.ece.mcgill.ca/Telecom/Docs/cdma.html on Jul. 5, 2007.

CDMA Overview—Access Schemes, downloaded from the World Wide Web at http://www.umtsworld.com/technology/cdmabasics.htm on Jul. 5, 2007.

Code Division Multiple Access, downloaded from http://en.wikipedia.org/wiki/CDMA on Jul. 5, 2007.

Binary Numbers—Adding and Subtracting Binary Numbers, downloaded from http://www.helpwithpcs.com/courses/adding-subtracting-binary-numbers.htm on Jul. 5, 2007.

David Barras, et.al, A Comparison Between ultra-Wideband and Narrowband Transceivers, Laboratory for Electionics, Swiss Federal Institute of Technology (ETH), Zurich, Switzerland, Oct. 26, 2004.

"FCC Approves First Commercial UWB Chipset", downloaded from the World Wide Web at http://www.wi-fiplanet.com.news/print.php/3392771 on Nov. 29, 2006.

David Yaish, Why MB-OFDM Is the Best Solution for the Industry, UWB Insider, Apr. 29, 2004.

Ultra-wideband, downloaded from http://en.wikipedia.org/wiki/Ultra_wideband on Dec. 13, 2006.

Mike Harwood, Understanding Networking Components and Devices for the Network+Exam, downloaded from the World Wide Web at http://www.examcram2.com/articles/article.asp?p=398091&seqNum=13&rl=1 on Dec. 28, 2006.

Want WiMax?, Aug. 31, 2006, downloaded from the World Wide Web at http://www.navini.com/Website/assets/pdfs/Brochures/Navini_Overview_04.pdf.

PCMAG, Encyclopedia, Definition of Baseband, Computer Desktop Encyclopedia, downloaded from the World Wide Web at http://www.pcmaq.com/encyclopedia_term/0,2452,t=baseband&i=38438,00.asp on Jan. 4, 2007.

Domestic AC Power Plugs and Sockets, downloaded from the World Wide Web on at http://en.wikipedia.org/wiki/Domestic_AC_power_plugs_and_sockets on Aug. 4, 2006.

Federal Communications Commission, "What is a Broadband", downloaded from the World Wide Web at http://www.fcc.gov/cgb/broadband.html on Dec. 28, 2006.

James Stenger, "Broadband power Line Tutorial", Wave Report, downloaded from the World Wide Web at http://www.wave-report.com/tutorials/bpl.htm on Jun. 2, 2006.

Robert Valdes, "How Broadband Over Powerlines Works", How Stuff Works, downloaded from the World Wide Web at http://computer.howstuffworks.com/bpl.htm/printable on Jun. 2, 2006.

Commissioners Michael J. Copps and Kevin J. Martin, First Report and Order, In the Matter of Revision of part 15 of the Commission's Rules Regarding Ultra-Wideband Transmission Systems, Apr. 22, 2002.

U.S. Appl. No. 11/838,744, filed Aug. 14, 2007.

* cited by examiner

```
                    ┌─────────┐
                    │  Start  │
                    └────┬────┘
                         ↓
            ┌────────────────────────────┐
            │  Recovering a CDS-5A       │
            │  and recovering a CDS-5B   │
            └────────────┬───────────────┘ ~500
                         ↓
            ┌────────────────────────────┐
            │  Aggregating CDS-5A and CDS-5B │
            │  so as to generate an A-CDS-5  │
            └────────────┬───────────────┘ ~502
              ┌──────────┴──────────┐
              ↓                     ↓
```

| Modulating a carrier signal-5A with A-CDS-5 so as to generate a UWB signal-5 carrying A-CDS-5 | Modulating a carrier signal-5B with A-CDS-5 so as to generate an N-UWB signal-5 carrying A-CDS-5 |
|---|---|
| ~504 | ~508 |
| Transmitting UWB signal-5 away from a UWB-T for reception at at least one other UWB-T | Transmitting N-UWB signal-5 away from an N-UWB-T for reception at at least one other N-UWB-T |
| ~506 | ~510 |
| End | End |

Figure 5

SYSTEM AND METHOD FOR INDOOR WIRELESS SERVICE DISTRIBUTION VIA ULTRA-WIDEBAND SIGNALS, AND AGGREGATION OF COMBINED DIGITAL SIGNALS FOR WIRELESS SERVICE

FIELD OF INVENTION

The present invention relates to communication of digital signals for wireless service, and more particularly to communication of ultra-wideband signals carrying combined digital signals for wireless service, and aggregation of the combined digital signals.

DESCRIPTION OF RELATED ART

Wireless carriers provide wireless communication service to wireless communication customers. In order to improve the wireless communication service provided to such customers, some wireless carriers are implementing or are considering implementing a distributed antenna system (DAS) to extend the range of their existing wireless network infrastructure.

A current wireless network infrastructure may include multiple base transceiver stations (BTSs) that radiate radio frequency (RF) signals from an antenna so as to form a cell and/or cell sector. A wireless carrier may extend the range of its wireless network infrastructure by connecting a DAS to one or more of the BTSs. Each DAS may include one or more remote antenna entities, a dedicated transport medium that connects a BTS to the one or more remote antenna entities, and one or more antennas connected to each of the one or more remote antenna entities. A BTS can provide RF signals to one or more remote antenna entities (i.e., located remote from the BTS) and, in turn, the one or more antennas connected to the remote antenna entities may radiate the received RF signals so as to extend a cell and/or cell sector coverage to the vicinity of each remote antenna entity (i.e., at a location remote from the BTS).

In current implementations, the dedicated transport medium, such as a fiber optic cable, is used to provide a communication path between a BTS and the remote antenna entities of the DAS. The dedicated transport medium is a mechanism in which all data transported through the transport medium passes through the BTS and the DAS. A dedicated transport medium is necessary because the signals currently transmitted between the BTS and the DAS take up most, if not all, of the capacity of the transport medium.

As an example, a BTS and a DAS may carry out communications between themselves by using a dedicated transport mechanism to carry wireless service signaling in accordance with the Code Division Multiple Access (CDMA) protocol. The CDMA protocol uses a spread spectrum signal in which the users' information signals to be communicated (the traffic channels) plus control information (the control channels) are spread over a much wider band channel than what would be required to communicate the information signal before the information signal is spread over that channel. This enables the signal to be resilient to interference, allowing more users to share the same spectrum, thereby increasing spectral efficiency.

In a typical BTS, the information signals and the control information modulate an RF carrier, forming an analog RF signal which is then sent through an antenna feed from the BTS to an antenna for propagation (e.g., transmission) over the air. If instead it is desired to send the information signals and control information through a dedicated transport medium to a remote antenna entity of a DAS, then the analog RF signal is sent through the antenna feed from the BTS to a device that interfaces to the dedicated transport medium, and this device then sends the analog RF signal over the dedicated transport medium. Alternatively, the device that interfaces to the dedicated transport medium may sample the analog RF signal sent through the antenna feed, at a rate at least twice that of the bandwidth, according to the Nyquist theorem, to create a digitized representation of the analog RF signal, and then send the digitized RF signal via the dedicated transport medium to the remote antenna entity of the DAS. In either case, the dedicated transport medium is necessary between the BTS and the remote antenna entity of the DAS so as to allow for communication of the high-bandwidth analog RF signal or the digitized representation of the analog RF signal.

Communicating the high-bandwidth analog RF signal or the digitized representation of the analog RF signal between a BTS and a remote antenna entity of a DAS using a dedicated transport medium, however, is undesirable, as it can be quite costly to provide and maintain such a dedicated transport medium.

SUMMARY

The present invention is directed to a distributed antenna system (DAS) comprising a plurality of remote antenna entities. The DAS extends and/or improves cell or cell sector coverage provided by a base transceiver station (BTS). The present invention is also directed to methods for wireless transmission of ultra-wideband (UWB) signals carrying a combined digital signal between the remote antenna entities so as to extend communication from one remote antenna entity (RAE) to another RAE. Wireless transmission of the UWB signals provides for communication of the combined digital signals from one RAE to another RAE even if the RAEs are not connected together via a wired communication network.

A UWB signal may comprise a signal in accordance with a UWB industry standard such as a Multi-band Orthogonal Frequency Division Multiplexing (MB-OFDM) standard or a Direct Sequence Ultra Wideband (DS-UWB) standard. As an example, a UWB signal may comprise a signal that occupies 500 MHz or more of the frequency band, such as a frequency band between and including 3.1 GHz and 10.6 GHz.

For forward-link communications from the BTS to an RAE, a combined digital signal may represent the total information (e.g., traffic and control digital signals) to be transmitted to one or more wireless communication devices via multiple forward-link communication channels during a given period of time. For reverse-link communications (e.g., communications in a direction from an RAE to the BTS), a combined digital signal may represent the total information transmitted to the RAE from the one or more wireless communication devices via multiple reverse-link communication channels during a given period of time. The BTS may assign the forward-link and reverse-link communication channels to the one or more wireless communication devices. The forward-link and reverse-link communication channels may carry digital signals according to any of a variety of air interface protocols, such as a CDMA air interface protocol, a Time Division Multiple Access (TDMA) air interface protocol, or an Orthogonal Frequency Division Multiple Access (OFDMA) air interface protocol.

In one respect, an exemplary embodiment of the present invention may take the form of a method that includes: (i) at a signal conditioner located at a remote antenna entity, receiving from a first transceiver, a non-ultra-wideband signal carrying an analog baseband signal, demodulating the non-ultra-wideband signal so as to recover the analog baseband signal, making power level measurements of the recovered analog baseband signal at a clock rate interval for an air interface protocol defining a set of wireless communication channels, generating a combined digital signal comprising data bits that represent a power level measurement of the recovered analog baseband signal measured at the clock rate interval, and modulating a carrier signal with the combined digital signal so as to generate an ultra-wideband signal carrying the combined digital signal, and (ii) at the second transceiver, receiving from the signal conditioner the ultra-wideband signal, and thereafter transmitting the ultra-wideband signal away from the second transceiver. In accordance with this method, the analog baseband signal represents digital signals for the set of wireless communication channels, such as a set of forward-link communication channels or a set of reverse-link communication channels, and the digital signals are converted to the analog baseband signal at the clock rate interval.

In another respect, an exemplary embodiment of the present invention may take the form of a remote antenna entity that includes: (i) a first transceiver for receiving and transmitting ultra-wideband signals, (ii) a second transceiver for receiving and transmitting non-ultra-wideband signals, and (iii) a signal conditioner connected to the first transceiver and to the second transceiver. The second transceiver provides to the signal conditioner a non-ultra-wideband signal received at the second transceiver. The non-ultra-wideband signal carries an analog baseband signal representing digital signals for multiple wireless communication channels. The digital signals are converted to the analog baseband signal at a clock rate interval for an air interface protocol defining the multiple wireless communication channels. The signal conditioner: (i) demodulates the non-ultra-wideband signal so as to recover the analog baseband signal, (ii) makes power level measurements of the recovered analog baseband signal at the clock rate interval, (iii) generates a combined digital signal comprising data bits that represent one of the power level measurements of the analog baseband signal, and (iv) modulates a carrier signal with the combined digital signal so as to generate an ultra-wideband signal carrying the combined digital signal. The first transceiver wirelessly transmits the ultra-wideband signal away from the remote antenna entity.

In yet another respect, an exemplary embodiment of the present invention may take the form of a system including: (i) a first remote antenna entity comprising a first non-ultra-wideband transceiver, a first ultra-wideband transceiver, and a first signal conditioner connected to the first non-ultra-wideband transceiver and to the first ultra-wideband transceiver, and (ii) a second remote antenna entity comprising a second non-ultra-wideband transceiver, a second ultra-wideband transceiver, and a second signal conditioner connected to the second non-ultra-wideband transceiver and to the second ultra-wideband transceiver. The first ultra-wideband transceiver wirelessly transmits to the second ultra-wideband transceiver a first ultra-wideband signal carrying a combined digital signal comprising data bits representing a power level measurement of a first analog baseband signal measured at a clock rate interval for an air interface protocol defining multiple wireless communication channels. The first analog baseband signal represents digital signals for the multiple wireless communication channels. The second signal conditioner: (i) receives the first ultra-wideband signal from the second ultra-wideband transceiver, (ii) recovers the combined digital signal from the first ultra-wideband signal, (iii) uses the recovered combined digital signal to generate a second analog baseband signal, wherein the second analog baseband signal represents the digital signals for the multiple wireless communication channels, and (iv) modulates a carrier signal with the second analog baseband signal so as to generate a non-ultra-wideband signal carrying the second analog baseband signal. The second non-ultra-wideband transceiver transmits the non-ultra-wideband signal away from the second remote antenna entity for reception at one or more wireless communication devices.

In still yet another respect, an exemplary embodiment of the present invention may take the form of a method that includes: (i) receiving a non-ultra-wideband signal carrying a set of data packets, the set of data packets comprises a payload representing a combined digital signal, (ii) recovering the combined digital signal from the set of data packets; (iii) modulating an ultra-wideband carrier signal with the recovered combined digital signal so as to generate an ultra-wideband signal carrying the combined digital signal; and (iv) transmitting the ultra-wideband signal away from a first ultra-wideband transceiver for reception of the ultra-wideband signal at a second ultra-wideband transceiver. The combined digital signal is generated at a base transceiver station signal conditioner connected to a base transceiver station. The combined digital signal comprises data bits representing a power level measurement of an analog baseband signal measured at a clock rate interval for an air interface protocol defining multiple communication channels. The analog baseband signal is carried by a second non-ultra-wideband signal provided by the base transceiver station to the base transceiver station signal conditioner.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which:

FIG. 5 is a flow chart depicting a set of functions that may be carried out with an exemplary embodiment so as to form an aggregated combined digital signal.

Reference numerals are shown in the drawings to identify various elements of the drawings. Drawing elements having identical reference numerals are substantially identical or identical elements.

DETAILED DESCRIPTION

Figure 1:
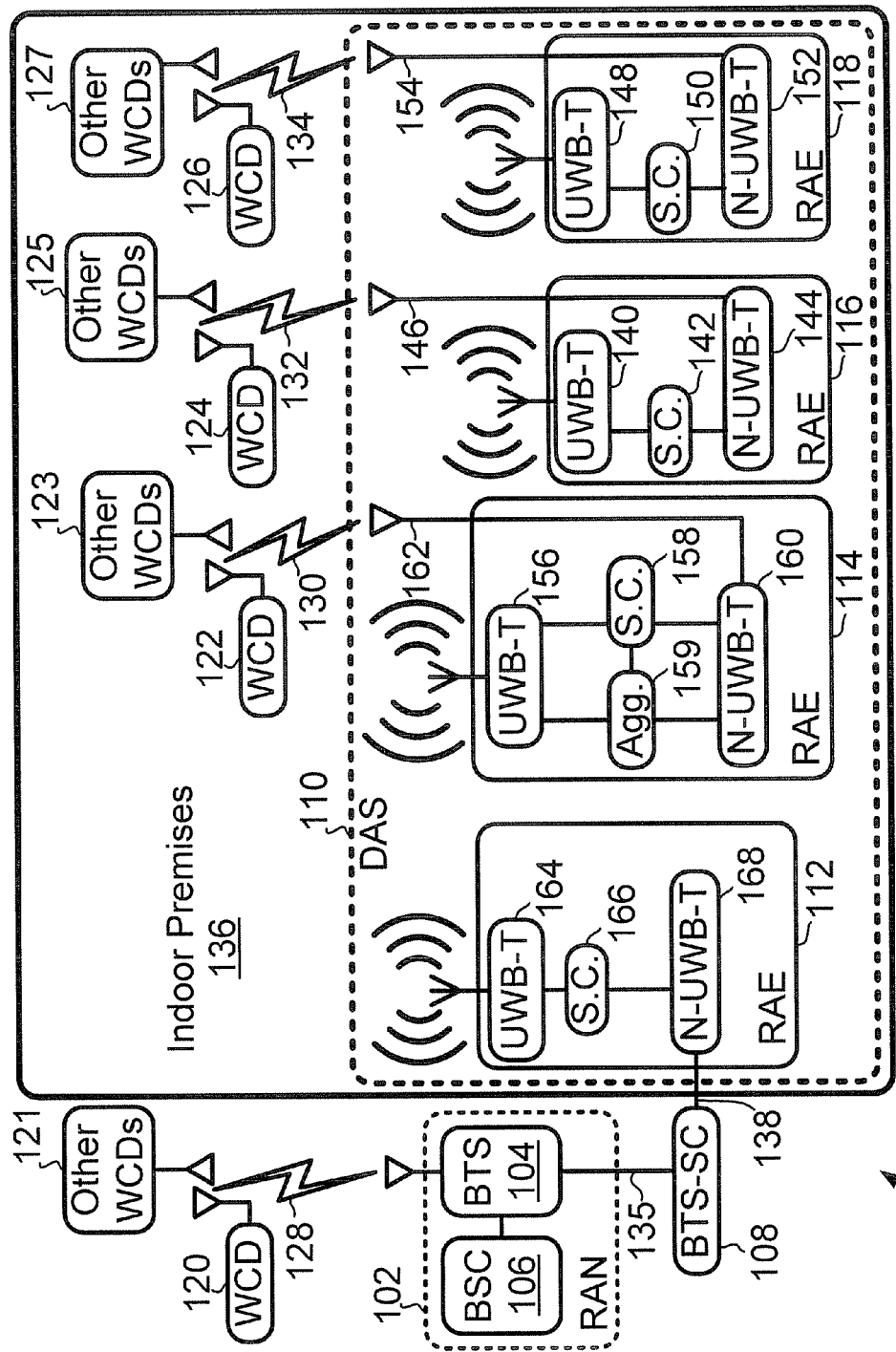
FIG. 1 is a block diagram of a system in which an exemplary embodiment may be implemented.

The following detailed description includes a number of acronyms and abbreviations. While definitions are typically provided with the first instance of each acronym and abbreviation, for convenience, Table 1 below provides a list of the acronyms and abbreviations and their respective definitions.

TABLE 1

| ACRONYM/ ABBREVIATION | DEFINITION |
|---|---|
| A-CDS | Aggregated Combined Digital Signal |
| BPL | Broadband over Power Line |
| BSC | Base Station Controller |
| BTS | Base Transceiver Station |
| CDMA | Code Division Multiple Access |
| CDS | Combined Digital Signal |
| DAS | Distributed Antenna System |
| dB | Decibel |
| DSL | Digital Subscriber Line |
| DS-UWB | Direct Sequence Ultra-wideband |
| EVDO | Evolution Data Optimized |
| $f_H$ | Frequency$_{High}$ |
| $f_L$ | Frequency$_{Low}$ |
| GHz | Giga-Hertz |
| GSM | Global System for Mobile Communications |
| HFC | Hybrid Fiber Coaxial |
| Hz | Hertz |
| iDEN | Integrated Digital Enhanced Network |
| IP | Internet Protocol |
| LSB | Least Significant Bit |
| MB-OFDM | Multi-band Orthogonal Frequency Division Multiplexing |
| MHz | Mega-Hertz |
| MSB | Most Significant Bit |
| MSC | Mobile Switching Center |
| N-UWB | Non-ultra wideband |
| N-UWB-T | Non-ultra-wideband Transceiver |
| OFDMA | Orthogonal Frequency Division Multiple Access |
| PDSN | Packet Data Serving Node |
| PSTN | Public Switched Telephone Network |
| RAE | Remote Antenna Entity |
| RAN | Radio Access Network |
| RF | Radio Frequency |
| TDMA | Time Division Multiple Access |
| UMTS | Universal Mobile Telephony System |
| UWB | Ultra-wideband |
| UWB-T | Ultra-wideband Transceiver |
| VAC | Volts Alternating Current |
| WCD | Wireless Communication Device |
| 1xRTT | 1x (single carrier) Radio Transmission Technology |

The following detailed description includes alpha and/or alpha-numerical suffixes (e.g., "-1" and "-5A") so as clarify various signals discussed throughout the detailed description.

1. OVERVIEW

The present invention pertains to a distributed antenna system (DAS) for a base transceiver station (BTS). The BTS forms a cell or cell sector by transmitting digital signals for wireless service over a set of forward-link communication channels. The DAS comprises a plurality of remote antenna entities (RAEs). Each RAE of the DAS extends the cell or a cell sector of the BTS by transmitting the same digital signals for wireless service over a respective set of communication channels similar to the set of forward-link communication channels of the BTS. Each RAE of the DAS may be located within an indoor premises so as to extend the cell or cell sector of the BTS to an area located within the indoor premises. Alternatively, one or more RAE of the DAS may be located outdoors, such as at an outdoor parking lot that provides a place for occupants of the indoor premises to park their motor vehicles.

Each RAE of the DAS may include an ultra-wideband transceiver (UWB-T) for wirelessly transmitting ultra-wideband (UWB) signals and for wirelessly receiving UWB signals. The UWB signals transmitted by the UWB-T may be received by another UWB-T that is located at another RAE of the DAS. The UWB signals received by the UWB-T may be transmitted from the other UWB-T. Alternatively, the UWB signals transmitted by the UWB-T may be received by a plurality of UWB-Ts, and the UWB signals received by the UWB-T may be received from a plurality of UWB-Ts.

For purposes of this description, UWB signals may be signals in a frequency band within a bandwidth designated by the United States Federal Communications Commission (FCC) for use by ultra-wideband signal. As an example, UWB signals may be signals in accordance with "Revision of Part 15 of the Commission's Rules Regarding the Ultra-Wideband Transmission Systems," Federal Communications Commission, FCC 02-48, which was adopted Feb. 14, 2002 and released Apr. 22, 2002, and which is incorporated herein by reference. As another example, UWB signals may be signals that have a fractional bandwidth greater than 0.25 and/or that occupy 500 MHz or more of a frequency band. The fractional bandwidth of a signal may be defined as $2(f_H - f_L)/(f_H + f_L)$, where $f_H$ is an upper frequency of a −10 dB emission point of the signal and $f_L$ is a lower frequency of the −10 dB emission point of the signal. As yet another example, the UWB signals may be signals having a −10 dB bandwidth in the frequency band of 3.1 GHz to 10.6 GHz.

Alternatively, or additionally, UWB signals may be signals in accordance with a UWB industry standard such as a Multi-band Orthogonal Frequency Division Multiplexing (MB-OFDM) standard or a Direct Sequence Ultra Wideband (DS-UWB) standard defined by an industry group such as WiMedia Alliance or UWB Forum. A UWB-T may transmit and/or receive UWB signals according to any of these standards. The UWB-T or the RAE comprising the UWB-T may comprise program logic (e.g., a protocol handler) to process signals arranged in accordance with any of these standards.

Each UWB signal transmitted by an RAE may carry a combined digital signal (CDS). The CDS may represent digital signals to be carried over multiple forward-link communication channels to one or more wireless communication devices (WCDs). Alternatively, the CDS may represent digital signals carried over multiple reverse-link communication channels from one or more WCDs. The digital signals of this alternative CDS may be destined for a BTS and, in turn, another communication device that communicates via the BTS. Each UWB signal carrying a CDS may be wirelessly transmitted from one RAE to another RAE such that these RAEs do not have to be connected to each other via a wireline communication network.

In accordance with the present invention, each RAE of the DAS may also include a non-ultra-wideband transceiver (N-UWB-T) for communicating non-ultra-wideband (N-UWB) signals. N-UWB signals are signals that are not UWB signals. As an example, non-UWB signals may comprise signals that have a fractional bandwidth less than or equal to 0.25. As another example, non-UWB signals may comprise signals that occupy less than or equal to 500 MHz of a frequency band, such as a frequency band between and including 3.1 GHz and 10.6 GHz. As yet another example, non-UWB signals may be signals having a −10 dB bandwidth outside of the frequency band between 3.1 GHz and 10.6 GHz. As still yet another example, non-UWB signals may be signals in a frequency band within a bandwidth not designated by the FCC for use by ultra-wideband signals. Other examples of N-UWB signals are also possible.

N-UWB signals may be transmitted over a broadband wireline network or a broadband wireless network. As an example, transmission of N-UWB signals over a broadband wireless network may include transmitting the N-UWB signals over an air interface according to a cellular air interface protocol, such as a CDMA evolution-data optimized (CDMA-EVDO) air interface protocol, or an Orthogonal Frequency Division Multiple Access (OFDMA) air interface protocol.

2. EXEMPLARY ARCHITECTURE

FIG. 1 is a block diagram of a system 100 in accordance with an exemplary embodiment of the present invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As shown in FIG. 1, system 100 includes: (i) a radio access network (RAN) 102 including a BTS 104 and a base station controller (BSC) 106, (ii) a BTS signal conditioner (BTS-SC) 108 that connects to BTS 104 via an antenna feed 135, (iii) a DAS 110 including RAEs 112, 114, 116, 118, (iv) WCDs 120, 122, 124, 126, and (iv) a shared transport medium 138 for carrying out communication between BTS-SC 108 and RAE 112. FIG. 1 depicts an indoor premises 136 in which system 100 or a portion of system 100 may operate.

WCD 120 and BTS 104 communicate with each other via an air interface 128. Air interface 128 may include multiple forward-link communication channels and multiple reverse-link communication channels. One or more other WCDs 121 may communicate with BTS 104 via air interface 128.

WCD 122 and RAE 114 communicate with each other via an air interface 130. Air interface 130 may include multiple forward-link communication channels and multiple reverse-link communication channels. One or more other WCDs 123 may communicate with RAE 114 via air interface 130.

Similarly, WCD 124 and RAE 116 communicate with each other via an air interface 132, and WCD 126 and RAE 118 communicate with each other via an air interface 134. Air interface 132 may include multiple forward-link communication channels and multiple reverse-link communication channels. Air interface 134 may include multiple forward-link communication channels and multiple reverse-link communication channels. One or more other WCDs 125 may communicate with RAE 116 via air interface 132, and one or more other WCDS 127 may communicate with RAE 118 via air interface 134.

For purposes of this description, the forward-link communication channels carry communications in a direction from a BTS towards a WCD or from an RAE towards a WCD. BTS 104 may assign one or more of the forward-link communication channels to a WCD. In accordance with a CDMA air interface protocol, the multiple forward-link communication channels may include a pilot channel, a medium access control channel, a control channel, a paging channel, a pilot channel, and/or a traffic channel. The traffic channel may include a voice channel and/or a data channel. Other examples of forward-link communication channels are also possible.

Reverse-link communication channels carry communications in a direction from a WCD towards a BTS or from a WCD towards an RAE. BTS 104 may assign one or more of the reverse-link communication channels to a WCD. In accordance with a CDMA air interface protocol, the multiple reverse-link communication channels may include access channels and traffic channels. Other examples of reverse-link communication channels are also possible.

Air interfaces 128, 130, 132, 134 all comprise the same forward-link communication channels. For example, air interfaces 128, 130, 132, 134 may each comprise forward-link communication channels assigned to WCDs 120, 122, 124, 126 and to the other WCDs 121, 123, 125, 127.

On the other hand, air interfaces 128, 130, 132, 134 do not necessarily comprise all of the same reverse-link communication channels. For example, air interfaces 128, 130, 132, 134 could each comprise a distinct set of reverse-link communication channels that do not have any communication channels in common.

Alternatively, two or more of air interfaces 128, 130, 132, 134 may comprise reverse-link communication channels assigned to a single wireless communication device. For example, air interface 130 and air interface 132 may each comprise reverse-link communication channels assigned to WCD 124. In accordance with this example, WCD 124 may transmit signals for reverse-link communication channels with sufficient power such that the signals are received by RAEs 114, 116. FIG. 1 does not depict air interface communications between WCD 124 and RAE 114 for clarity of the figure.

BTS 104 may be arranged in any of a variety of configurations. For example, BTS 104 may be arranged in a configuration in accordance with a proprietary specification of a BTS manufacturer, such as Nortel Networks, Toronto, Canada. As another example, BTS 104 may be arranged in a configuration in accordance with an open BTS specification, such as a Common Public Radio Interface (CPRI) specification, or an Open Base Station Architecture Initiative (OBSAI) specification. Alternatively or additionally, BTS 104 may be arranged as a software defined radio system that includes software for controlling hardware to tune to one or more frequency bands and for receiving and transmitting modulated communication signals at the one or more frequency bands.

BTS 104 connects to BSC 106. BSC 106 may control BTS 104 and/or one or more other BTSs (not shown) within RAN 102. BSC 106 may connect to a mobile switching center (MSC), which is a switch that provides BTS 104 with connectivity to a public switched telephone network (PSTN). BSC 106 may also connect to a telecommunications gateway, such as a packet data serving node (PDSN), for providing BTS 104 with connectivity to an Internet Protocol (IP) network, such as the Internet.

The multiple forward-link communication channels assigned by BTS 104 may carry traffic sent from communication devices within the PSTN, from communication devices within the IP network, and/or from other communication devices. The multiple reverse-link communication channels assigned by BTS 104 may carry traffic sent to communication devices within the PSTN, to communication devices within the IP network, and/or to other communication devices.

As shown in FIG. 1, BTS 104 is located outside of indoor premises 136. Alternatively, BTS 104 may be located within indoor premises 136. In this regard, BTS 104 may be a pico-BTS located within indoor premises 136. A pico-BTS may create a pico cell and/or an in-building cell, either of which may be configured for a single story or multiple stories of indoor premises 136.

Indoor premises 136 may be any of a variety of indoor premises. In one respect, indoor premises 136 may be aboveground, belowground, or partially aboveground and partially belowground. In another respect, indoor premises 136 may be single-story premises or multiple-story premises. As an example, indoor premises 136 may be a house, an apartment building, an office building, a factory, a shopping mall, a riverboat casino, or a tunnel. Other examples of indoor premises 136 are also possible.

BTS 104 may form a corresponding cell or cell sector by radiating radio frequency (RF) N-UWB signals away from BTS 104. An N-UWB signal radiated by BTS 104 may carry an analog baseband signal representing digital signals for the forward-link communication channels of air interface 128 in accordance with a cellular air interface protocol. These forward-link communication channels, in combination, provide means for carrying forward-link digital signals (e.g., signals representing the total information to be transmitted from BTS 104 for a given period of time) to WCD 120 and to the other WCDs 121.

WCDs 120, 122, 124, 126, and the other WCDs 121, 123, 125, 127 may each be any of a variety of wireless communication devices that perform communications inside and/or outside of indoor premises 136. In one respect, one or more of the WCDs may be a mobile WCD (e.g., a mobile phone), a wireless personal digital assistant (PDA), or a portable computer having a wireless network interface. In another respect, one or more of the WCDs may be a fixed WCD that operates at a fixed location, such as indoor premises 136. As an example, a fixed WCD may be arranged as a wireless local loop hub that provides an interface between (i) conventional landline telephone equipment located at indoor premises 136, and (ii) a PSTN accessible via BSC 106 and an MSC. Other examples of a mobile WCD and a fixed WCD are also possible.

WCDs 120, 122, 124, 126 may each radiate N-UWB signals so as to form one or more reverse-link communication channels of air interfaces 128, 130, 132, 134, respectively. Similarly, each WCD of the other WCDs 121, 123, 125, 127 may radiate N-UWB signals so as to form one or more reverse-link communication channels of air interfaces 128, 130, 132, 134, respectively.

BTS 104 and BTS-SC 108 may transmit signals to each other via antenna feed 135. BTS 104 may transmit to BTS-SC 108 an N-UWB signal carrying an analog baseband signal representing digital signals for multiple forward-link communication channels, such as the forward-link communication channels assigned by BTS 104 to WCDs 120, 122, 124, 126 and the other WCDs 121, 123, 125, 127. For purpose of this description, the N-UWB signal transmitted by BTS 104 to BTS-SC 108 will be referred to as N-UWB signal-1 and the analog baseband signal carried by N-UWB signal-1 will be referred to as analog baseband signal-1. BTS 104 may also transmit N-UWB signal-1 via air interface 128.

Analog baseband signal-1 represents digital signals encoded at a given data rate. For example, if BTS 104 transmits N-UWB signal-1 via air interface 128 according to the CDMA-1xRTT air interface protocol, then N-UWB signal-1 and the analog baseband signal-1 represent digital signals encoded at a chip data rate of 1.2288 Mbps. Other examples of an air interface protocol and a chip data rate are also possible.

A chip period "$T_c$" is an amount of time used to provide the total information to be transmitted from BTS 104 for a given chip data rate. A chip period "$T_c$" equals one bit divided by a chip data rate in bits per second. For CDMA 1xRTT, the chip period "$T_c$" equals one bit divided by 1.2288 Mbps, which equals 813.3 nano seconds. A clock rate interval for an air interface protocol may be equivalent to the chip period. In this regard, the clock rate interval for CDMA 1xRTT may be 813.3 nano seconds such that power level measurements of an analog baseband signal to be carried via CDMA 1xRTT communication channels are taken every 813.3 nano seconds for use in generating a CDS.

Figure 6:
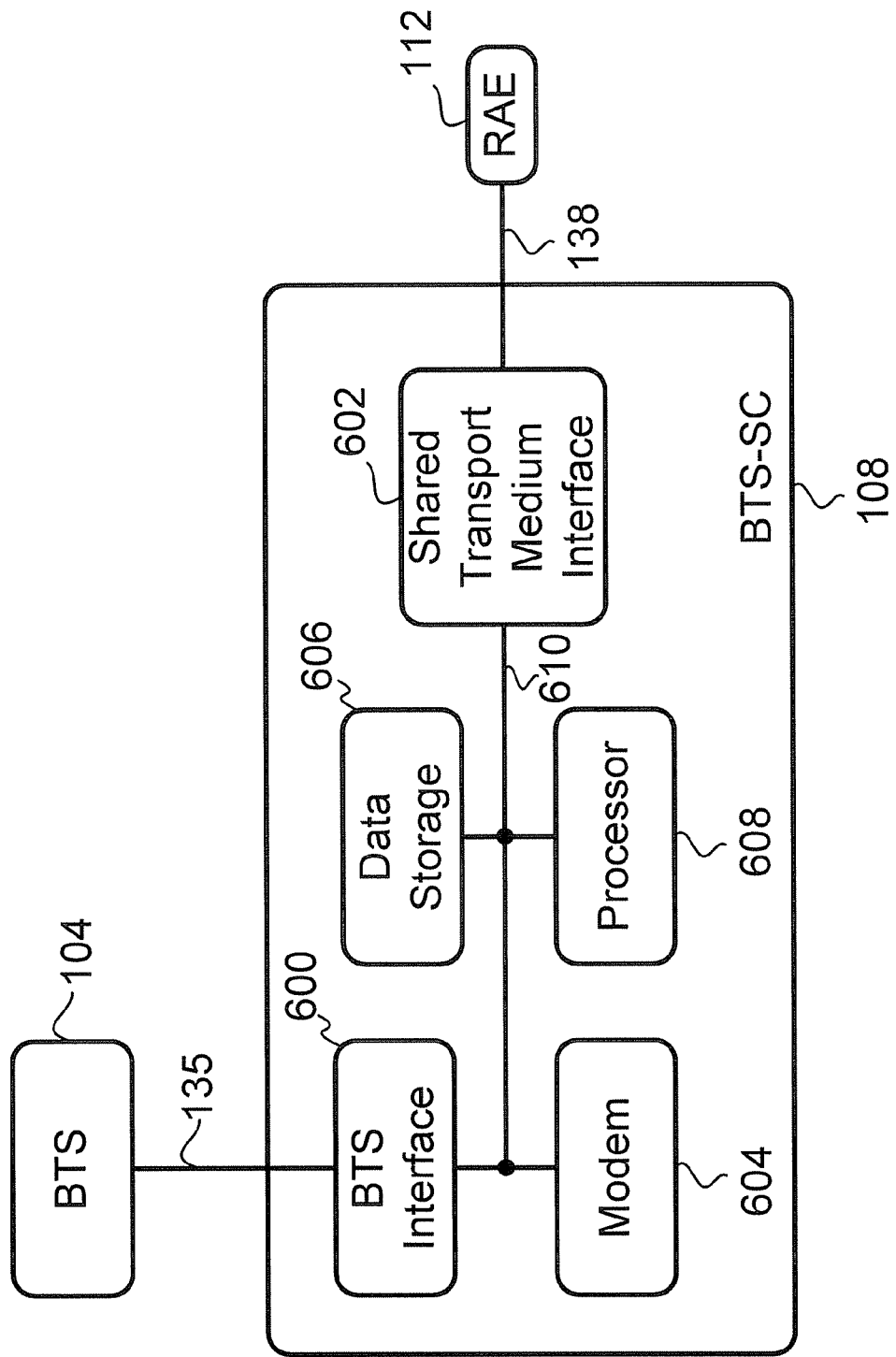
FIG. 6 is a block diagram of an exemplary base transceiver station signal conditioner.

FIG. 6 shows details of BTS-SC 108. As shown in FIG. 6, BTS-SC 108 comprises a BTS interface 600 that connects to BTS 104 via antenna feed 135, a shared transport medium interface 602 that interfaces to shared transport medium 138, a modem 604, a processor 608, and data storage 606, all linked together via a system bus or other connection mechanism 610. In an alternative embodiment, BTS interface 600 may interface to BTS 104 via an air interface.

Modem 604 may demodulate a signal received at BTS interface 600 or a signal received at shared transport medium interface 602. For example, modem 604 may demodulate a signal received at BTS interface 600 so as to recover an analog baseband signal carried by the signal. This analog baseband signal may represent digital signals for multiple forward-link communication channels.

Modem 604 may modulate signals to be transmitted to BTS 104 via BTS interface 600 and signals to be transmitted to RAE 112 via shared transport medium interface 602. As an example, modem may modulate a carrier signal with a CDS so as to generate a signal carrying the CDS. The signal carrying the CDS may be transmitted to shared transport medium interface 602 for transmission, in turn, to RAE 112 via shared transport medium 138.

Processor 608 may comprise one or more general purpose processors (e.g., INTEL microprocessors) and/or one or more special purpose processors (e.g., digital signal processors). Processor 608 may execute program instructions stored at data storage 606.

Data storage 606 comprises a computer-readable storage medium readable by processor 608. The computer-readable storage medium may comprise volatile and/or non-volatile storage components, such as optical, magnetic, organic or other memory or disc storage, which can be integrated in whole or in part with the processor 608.

Data storage 606 may store a variety of data. For example data storage 606 may store program instruction comprising: (i) instructions that cause a combined digital signal to be generated from an analog baseband signal recovered at BTS-SC 108, and (ii) instructions that cause the combined digital signal to be packetized as payload of a set of data packets. Other examples of data storable in data storage 606 are also possible.

N-UWB signal-1 may be received at BTS interface 600. BTS-SC 108 may generate a combined digital signal for each chip period of N-UWB signal-1. Each CDS generated by BTS-SC 108 may represent digital signals carried by N-UWB signal-1 for one chip period. If N-UWB signal-1 carries digital signals at a chip data rate of 1.2288 Mbps, then BTS-SC 108 may generate a CDS for each 813.3 nano second portion of N-UWB signal-1.

As an example, BTS-SC 108 may generate a CDS (hereinafter "CDS-1") by recovering analog baseband signal-1 from N-UWB signal-1, making power level measurements of analog baseband signal-1 at a clock rate interval for an air interface protocol defining multiple wireless communication channels, encoding the least significant hit positions of CDS-1 with a binary bit pattern that represents the one of the power level measurements, and encoding the most significant bit position of CDS-1 with a zero if the amplitude of analog baseband signal-1 is positive at the time when the power level measurement is made or a value of one if the amplitude of analog baseband signal-1 is negative at the time when the power level measurement is made. Table 2 lists data pertaining to generation and transmission of a CDS at a signal conditioner, such as BTS-SC 108 or a signal conditioner within an RAE.

TABLE 2

| Number of Bits (X) | Maximum No. of Communication Channels = $(2^{(X-1)}-1)$ | Bandwidth = (X * Chip Data Rate) (Chip Data rate for CDMA 1xRTT = 1.2288 Mbps) | Row # |
|---|---|---|---|
| 8 | 127 | 9.8304 Mbps | Row 1 |
| 7 | 63 | 8.6016 Mbps | Row 2 |
| 6 | 31 | 7.3728 Mbps | Row 3 |
| 5 | 15 | 6.1440 Mbps | Row 4 |
| Col. 1 | Col. 2 | Col. 3 | |

Column 1 specifies a value of X that indicates a number of bits each CDS will contain. For example, if X equals 8, then each CDS contains 8 bits. Of these 8 bits, the most significant bit (MSB) indicates whether analog baseband signal-1, for a given chip period, has a positive amplitude or a negative amplitude, and the other 7 bits (i.e., the 7 least significant bits (LSBs)) represent a power value measurement of analog baseband signal-1 measured at the clock rate interval for an air interface protocol defining multiple wireless communication channels. An MSB of "1" may indicate analog baseband signal-1 has a negative amplitude and an MSB of "0" may indicate analog baseband signal-1 has a positive amplitude. As an example, if CDS-1 equals "01111010," then the MSB is "0" and the least significant bits (LSBs) are "1111010." Similarly, when X equals 5, 6, or 7, the MSB of a 5-bit CDS, a 6-bit CDS, or a 7-bit CDS, respectively, may indicate whether the amplitude of analog baseband signal-1 for the given chip period is positive or negative and the LSBs that follow the MSB may represent the power value measurement of analog baseband signal-1 for the given chip period. Values of X less than 5 or greater than 8 may also be used to generate a CDS.

Column 2 specifies a maximum number of communication channels that correspond to a given value of X. The maximum number of communication channels equals $(2^{(X-1)}-1)$. For example, if X equals 5, then the maximum number of communication channels equals 15. In this regard, analog baseband signal-1 may represent digital signals for a number of communication channels between 1 and 15 channels. If X equals 6, then the maximum number of communication channels equals 31 and analog baseband signal-1 may represent digital signals for a number of communication channels between 1 and 31 channels. Other values of the maximum number of communication channels are also possible.

Column 3 specifies an amount of bandwidth to be used to carry a CDS for digital signals modulated at a chip data rate of 1.2288 Mbps (i.e., the chip data rate for CDMA 1xRTT). As an example, the bandwidth values listed in Column 3 may indicate how much bandwidth of shared transport medium 138 is used to carry a CDS. The bandwidth values listed in Column 3 equal the value of X times the date rate of 1.2288 Mbps. Other chip data rates of another air interface protocol may be used to determine the amount of bandwidth used to carry a CDS.

BTS 104 and/or BTS-SC 108 may determine which value of X BTS-SC 108 should use to generate CDS-1. For example, processor 608 of BTS-SC 108 may execute program instruction to determine the value of X. Execution of these program instruction may include substituting a Maximum Number of Communication Channels value for the term "Max. Number of Communication Channels" in the equation "Max. Number of Communication Channels=$(2^{(X-1)}-1)$" or substituting a bandwidth value for the term "Bandwidth" and a data rate value for the term "Data Rate" in the equation "Bandwidth=X*Data Rate."

As an example, a wireless carrier operating RAN 102 may select the maximum number of channels value and enter that value via a user interface of BTS 104, such as an operations and maintenance user interface. BTS 104 may provide BTS-SC 108 with the maximum number of channels value. Processor 608 may execute program instructions to determine the value of X by substituting the received value into the equation Max. Number of Communication Channels=$(2^{(X-1)}-1)$. Alternatively, BTS 104 may execute program instructions to determine the value of X based on the received maximum number of channels value and data rate value, and then provide the determined value of X to BTS-SC 108.

As another example, BTS-SC 108 may determine that N-UWB signal-1 comprises digital signals for a given number of communication channels and then select a value of X corresponding to a maximum number of communication channels value that is equal to or less than the given number of communication channels. BTS 104 may provide information to BTS-SC 108 that indicates the given number of channels. For example, BTS-SC 108 may receive information indicating that N-UWB signal-1 comprises digital signals for 46 channels and then select a value of X corresponding to a maximum number of communication channels value of 63. Alternatively, BTS 104 may determine the given number of communication channels, select the value of X, and provide the value of X to BTS-SC 108 so that BTS-SC 108 generates CDSs having a number of bits equal to X. Other examples of how BTS 104 and/or BTS-SC 108 determine the value of X for generating a CDS are also possible.

After generating a CDS, such as CDS-1, BTS-SC 108 may condition CDS-1 for transportation to RAE 112 via shared transport medium 138. Conditioning CDS-1 may comprise packetizing CDS-1 as payload of multiple data packets (hereinafter "data packets-1") and generating an analog baseband signal that represents data packets-1. A carrier signal may be modulated with the analog baseband signal representing data packets-1 so as to generate an N-UWB signal carrying this analog baseband signal, and thereafter, BTS-SC 108 may transmit the N-UWB signal to RAE 112 via shared transport medium 138.

In addition to generating a CDS and transmitting the CDS to RAE 112, BTS-SC 108 may receive from shared transport medium 138 an N-UWB signal carrying an analog baseband signal that represents a CDS (hereinafter "CDS-2"). CDS-2 may comprise data bits representing an amplitude and a power level measurement of an analog baseband signal that represents digital signals transmitted via multiple reverse-link communication channels. BTS-SC 108 may demodulate the N-UWB signal so as to recover the analog baseband signal representing the CDS, demodulate the analog baseband signal representing the CDS so as to recover the CDS, and convert the CDS into an another analog baseband signal that represents the digital signal transmitted via the multiple reverse-link communication channels. BTS-SC 108 may then modulate a signal carrier with the other analog baseband signal so as to generate an N-UWB signal carrying the other analog baseband signal, and thereafter, transmit this N-UWB signal to BTS 104 via antenna feed 135.

Shared transport medium 138 may be arranged in various configurations. In one respect, shared transport medium 138 may be arranged as a broadband wireline transport medium, such as a coaxial cable transport medium comprising an RG-6/U coaxial cable or another type of coaxial cable, an optical fiber transport medium comprising a fiber optic cable, a broadband over electrical power line transport medium, a hybrid fiber coaxial (HFC) transport medium, or a transport medium in compliance with International Telecommunication Union Telecommunications (ITU-T) recommendation G.993.2 entitled "Very-high-bit-rate Digital Subscriber Line 2" (e.g., a Digital Subscriber Line (DSL) transport medium).

In another respect, shared transport medium 138 may be arranged as a broadband wireless transport medium, such as a free space optics transport medium, a millimeter wave transport medium, a microwave radio transport medium, or a transport medium using at least a portion (i.e., one or more frequencies) of a broadband radio spectrum (e.g., 2.495 GHz to 2.690 GHz). Other examples of shared transport medium 138 are also possible.

In an alternative embodiment, BTS 104 may comprise any of the components shown n the BTS-SC 108. For example, BTS 104 may comprise the shared transport medium interface 602, modem 604, data storage 606, and processor 608. In this regard, modem 604, data storage 606, and/or processor 608 may carry out other functions typically carried out by a BTS.

Additionally, other details pertaining to a BTS-SC are provided in U.S. patent application Ser. No. 11/838,744, which is entitled "System and Method for Communicating a Combined Digital Signal for Wireless Service via Integrated Hybrid Fiber Coax and Power Line Communication Devices for a Distributed Antenna System over Shared Broadband Media," and which is incorporated by reference herein for all purposes.

Returning to FIG. 1, DAS 110 includes four RAEs, namely RAEs 112, 114, 116, 118. In accordance with the present invention, DAS 110 may include a number of RAEs greater than or less than four RAEs.

DAS 110 may extend the range of BTS 104 by extending the cell or cell sector coverage of BTS 104 to a location at which BTS 104 provides no cell or cell sector coverage or to a location at which BTS 104 provides inadequate cell or cell sector coverage.

DAS 110 may extend the range of BTS 104 to a location substantially within indoor premises 136. In this regard, RAEs 112, 114, 116, 118 may each be located within indoor premises 136. RAEs 112, 114, 116, 118 may be spaced apart so as to extend cell or cell sector coverage of BTS 104 throughout indoor premises 136. As an example, adjacent RAEs (e.g., RAEs 112, 114) may be spaced apart by a distance of approximately 15 meters (approximately 50 feet) or by a distance greater than or less than 15 meters. As another example, RAEs 112, 114, 116, 118 may be spaced apart by placing each of the RAEs on a distinct story of indoor premises 136. Other examples of RAE placement throughout indoor premises 136 are also possible.

Alternatively, one or more of RAEs 112, 114, 116, 118 may be located outside of indoor premises 136. For instance, RAE 118 may be located at a parking lot that serves occupants of indoor premises 136. In particular, RAE 118 may be removably attached to a light pole located at the parking lot. Other examples of an RAE being located outside of indoor premises 136 are also possible.

DAS 110 may also extend the range of BTS 104 to a location outside of indoor premises 136. In this regard, one or more of RAEs 112, 114, 116, 118 may extend the cell or cell sector coverage of BTS 104 by transmitting N-UWB signals with sufficient power to pass through walls of indoor premises 136 to a location outside of indoor premises 136.

In accordance with the present invention, each RAE of DAS 110 may be arranged in any of a variety of configurations. For example, an RAE may be arranged in a first exemplary configuration in which the RAE comprises a UWB-T, an RAE signal conditioner, and a wireless N-UWB-T. RAE 116 is arranged according to the first RAE configuration in that RAE 116 comprises a UWB-T 140, an RAE signal conditioner 142, and a wireless N-UWB-T 144. N-UWB-T 144 comprises an antenna 146 for transmitting and receiving wireless N-UWB signals. Similarly, RAE 118 is arranged according to the first RAE configuration in that RAE 118 comprises a UWB-T 148, an RAE signal conditioner 150, and a wireless N-UWB-T 152. N-UWB-T 152 comprises an antenna 154 for transmitting and receiving wireless N-UWB signals.

As another example, an RAE may be arranged according to a second exemplary configuration in which the RAE comprises a UWB-T, an RAE signal conditioner, an aggregator, and an N-UWB-T. RAE 114 is arranged according to the second RAE configuration in that RAE 114 comprises a UWB-T 156, an RAE signal conditioner 158, an aggregator 159, and a wireless N-UWB-T 160. N-UWB-T 160 comprises an antenna 162 for transmitting and receiving wireless N-UWB signals. Alternatively or additionally, the N-UWB-T of an RAE of the second configuration may comprise a wireline interface for transmitting and receiving N-UWB signals via a wired network.

As yet another example, an RAE may be arranged in a third exemplary configuration in which the RAE comprises a UWB-T, an RAE signal conditioner, and a wireline N-UWB-T. RAE 112 is arranged according to the third RAE configuration in that RAE 112 comprises a UWB-T 164, an RAE signal conditioner 166, and a wireline N-UWB-T 168. RAE 112 may also comprise an aggregator. Other exemplary RAE configurations are also possible.

UWB-Ts 140, 148, 156, 164 may wirelessly transmit and receive UWB signals. Each of these UWB-Ts may transmit UWB signals that are received by one or more UWB-Ts, and each of these UWB-Ts may receive UWB signals from one or more UWB-Ts.

UWB-Ts 140, 148, 156, 164 may transmit UWB signals in a daisy-chain fashion. For example, UWB-T 140 may transmit a UWB signal (hereinafter UWB signal-1) to UWB-T 156, which in turn transmits a first UWB signal substantially similar to UWB signal-1 to UWB-T 140, which in turn transmits a second UWB signal substantially similar to UWB signal-1 to UWB-T 148. The transmission of UWB signal-1 and the UWB signals substantially similar to UWB signal-1 in the daisy chain fashion allows each RAE to receive data (such as a CDS) carried by the UWB signal-1 and the UWB signals substantially similar to UWB signal-1.

UWB-Ts 140, 148, 156, 164 may be arranged as any UWB-T currently known to a person having ordinary skill in the art or that will be later developed. As an example, UWB-Ts 140, 148, 156, 164 may each comprise an integrated circuit (IC) including UWB transmitter circuitry, UWB receiver circuitry, and one or more UWB antennas, such as an antenna for receiving UWB signals and an antenna for transmitting UWB signals. Other examples of a UWB-T arrangement are also possible.

Signal conditioners 142, 150, 158, 166 may perform any of a variety of signal conditioning. Signal conditioner 142 may condition signals for communications to be carried out between UWB-T 140 and N-UWB-T 144. Similarly, signal conditioner 150 may condition signals for communications between UWB-T 148 and N-UWB-T 152, and signal conditioner 166 may condition signals for communications between UWB-T 164 and N-UWB-T 168. Signal conditioner 158 may condition signals for communications between UWB-T 156 and N-UWB-T 160.

As an example, signal conditioner 142 may (i) receive from N-UWB-T 144 an N-UWB signal carrying digital signals for multiple reverse-link communication channels, (ii) generate a CDS from the received N-UWB signal, (iii) generate a UWB signal carrying the CDS, and (iv) provide UWB-T 140 with the UWB signal carrying the CDS. In accordance with this example, the multiple reverse-link communications channels may be communication channels assigned by BTS 104 to WCD 124 and the other WCDs 125.

As another example, signal conditioner 142 may receive from UWB-T 140 a UWB signal carrying a CDS representing digital signals for multiple forward-link communication channels. Signal conditioner 142 may recover the CDS from the received UWB signal. Thereafter, signal conditioner 142 may modulate a UWB carrier signal with the recovered CDS so as to generate another UWB signal carrying the CDS. This other UWB signal may be provided to UWB-T 140 for transmission, in turn, to another UWB-T, such as UWB-T 148.

Alternatively, or additionally, signal conditioner 142 may generate from the recovered CDS an analog baseband signal representing the digital signals for multiple forward-link communication channels, modulate a carrier signal with the analog baseband signal so as to generate an N-UWB signal carrying the analog baseband signal, and provide the N-UWB signal to N-UWB-T 144 for transmission, in turn, to an N-UWB-T of another RAE, to BTS 104, and/or to one or more WCDs, such as WCD 124 and the other WCDs 125.

N-UWB-Ts 144, 152, 160 each comprise a wireless N-UWB transceiver that may transmit and receive N-UWB signals. As an example, N-UWB-T 144 may wirelessly transmit N-UWB signals having a destination of (i) one or more WCDs (ii) BTS 104, and/or (iii) another N-UWB-T, such as N-UWB-T 152 and/or N-UWB-T 160. The N-UWB signals transmitted by N-UWB-T 144 may comprise N-UWB signals provided by signal conditioner 142. As another example, N-UWB-T 144 may wirelessly receive N-UWB signals from (i) one or more of WCDs, such as WCD 124 and the other WCDs 125, (ii) BTS 104, and/or (iii) another N-UWB-T, such as N-UWB-T 152 and/or N-UWB-T 160. After receiving an N-UWB signal, N-UWB-T 144 may provide the received N-UWB signal to signal conditioner 142.

N-UWB-Ts 144, 152, 160, may be arranged in any of a variety of configurations. For example, N-UWB-Ts 144, 152, 160 may be arranged as a transceiver including a chipset and an antenna (e.g., antenna 146, 154, 162, respectively) for communicating N-UWB signals over an N-UWB air interface (e.g., air interface 132, 134, 130, respectively). An exemplary chipset that facilitates communication of N-UWB signals according to the CDMA air interface protocol is the MSM6800 chipset manufactured by Qualcomm Incorporated of San Diego, Calif. Other examples of a chipset for communicating N-UWB signals over an N-UWB air interface are also possible.

N-UWB-T 168 connects to signal conditioner 166 and interfaces to shared transport medium 138. If shared transport medium 138 comprises a wireline transport medium, then N-UWB-T 168 comprises an interface for transmitting N-UWB signals to and/or receiving N-UWB signals from the wireline transport medium. Alternatively or additionally, if shared transport medium 138 comprises a wireless transport medium, then N-UWB-T 168 comprises an interface for wirelessly transmitting N-UWB signals to and/or receiving N-UWB signals from the wireless transport medium.

As an example, N-UWB-T 168 may receive from signal conditioner 166 an N-UWB signal carrying an analog baseband signal that represents a CDS. The CDS may represent an amplitude and a power level measurement of an analog baseband signal that represents digital signals for multiple communication channels. N-UWB-T 168 may transmit the N-UWB signal to BTS-SC 108 via shared transport medium 138. BTS-SC 108 may recover the CDS from the N-UWB signal, generate another analog baseband signal that represents the digital signals for multiple communication channels, and then transmit the analog baseband signal generated at BTS-SC 108 to BTS 104 via antenna feed 135.

An aggregator, such as aggregator 159, may comprise any of a variety of devices and/or computer-readable program logic executable to carry out aggregation of multiple combined digital signals so as to generate an aggregated combined digital signal (A-CDS). The combined digital signals aggregated by aggregator 159 represent digital signals for multiple reverse-link communication channels. Aggregation of combined digital signals may allow for reducing the number of cell sectors of BTS 104 and/or reducing the amount of bandwidth required for carrying out reverse-link communications to BTS 104.

Table 3 lists data pertaining to generation and transmission of an A-CDS.

TABLE 3

| No. of Bits per CDS (X) | Max. no. of channels = $2^{(X-1)} - 1$ | Max. no. of CDS ($2^N$) | No. of Bits (N) | Total No. of Bits = N + X | Bandwidth = (N + X) * Chip Data Rate (Chip Data rate = 1.2288 Mbps for CDMA 1xRTT) |
|---|---|---|---|---|---|
| 8 | 127 | 4 | 2 | 10 | 12.288 Mbps |
| 8 | 127 | 16 | 4 | 12 | 14.7456 Mbps |
| 8 | 127 | 32 | 6 | 14 | 17.2032 Mbps |
| 7 | 63 | 4 | 2 | 9 | 11.0592 Mbps |
| 7 | 63 | 16 | 4 | 11 | 13.5168 Mbps |
| 7 | 63 | 32 | 6 | 13 | 15.9744 Mbps |
| 6 | 31 | 4 | 2 | 8 | 9.8304 Mbps |
| 6 | 31 | 16 | 4 | 10 | 12.288 Mbps |
| 6 | 31 | 32 | 6 | 12 | 14.7456 Mbps |
| 5 | 15 | 4 | 2 | 7 | 8.6016 Mbps |
| 5 | 15 | 16 | 4 | 9 | 11.0592 Mbps |
| 5 | 15 | 32 | 6 | 11 | 13.5168 Mbps |
| Col. 1 | Col. 2 | Col. 3 | Col. 4 | Col. 5 | Col. 6 |

Similar to Column 1 in Table 2, Column 1 of Table 3 specifies values of X that indicate the number of bits each CDS will contain. As shown in Table 3, the value of X may be 5, 6, 7, or 8. Alternatively, the value of X may be a value less than 5 or greater than 8.

Similar to Column 2 in Table 2, Column 2 of Table 3 specifies values of the term $(2^{(X-1)}-1)$, which indicate the maximum number of channels that correspond to a given value of X. As an example, when the value of X is 8, the maximum number of channels that may provide digital signals for generation of the CDS is 127 channels. As another example, when the value of X is 6, the maximum number of channels that may provide digital signals for generation of the CDS is 31 channels.

Column 3 specifies a maximum number of combined digital signals ($2^N$) that may be aggregated by aggregator 159. For example, as shown in the second row of Table 3, if the value of X is 8 and the amount bandwidth (shown in column 6) available for transmitting an A-CDS is 12.288 Mbps, then the maximum number of CDS ($2^N$) that may be aggregated is 4. If more than 4 CDSs are to be aggregated by aggregator 159, then the value of $2^N$ must exceed 4, such as the values of $2^N$ shown in rows 3-4, 6-7, 9-10, and 12-13. Values of the maximum number of CDSs ($2^N$) other than 4, 16, and 32 are also possible.

Column 4 specifies a number of bits (N) to be used in combination with the number of bits per CDS (X) to represent an A-CDS. As an example, the aggregation of 4 eight-bit CDSs having the value of 11111111 is a ten-bit binary number 1111111100. As shown in column 4, the value of N may be 2, 4, or 6. Alternatively, the value of N may be a value other than 2, 4, or 6.

Column 5 specifies a total number of bits (N+X) for an A-CDS generated by aggregator 159. As shown in column 5, the value of (N+X) may be 7, 8, 9, 10, 11, 12, 13, or 14 bits. Alternatively, the values of (N+X) may be values other than 7, 8, 9, 10, 11, 12, 13, or 14 bits.

Column 6 specifies an amount of bandwidth necessary to carry an A-CDS for a given chip data rate and values of X and N. The amount of bandwidth values shown in Column 6 are based on a chip data rate of 1.2288 Mbps, which is a chip data rate for CDMA 1xRTT. Other bandwidth values based on chip data rates other than 1.2288 Mbps, as well as other values of N and/or X, are also possible.

Aggregator 159 may be arranged to generate A-CDSs in accordance with data shown in one of the rows shown in Table 3. For example, aggregator 159 may execute program instruction to generate a 10-bit A-CDS by aggregating up to four 8-bit CDSs, in accordance with data shown in Table 3, row 2. Additionally, aggregator 159 may be arranged to receive a message comprising data that may be used to change how aggregator 159 generates A-CDSs. For purposes of this description, this message will be referred to as an aggregator update message.

An aggregator update message may comprise any of a variety of data. For example, an aggregator update message may comprise data shown in Table 3, such as the data in row 3 that indicates X equals 8 and N equals 4. Aggregator 159 may execute program instructions to use the data in an aggregator update message so as to determine other data in Table 3, such as the data indicating N plus X equals 12. In this way, after receiving an aggregator update message and executing the program instructions, aggregator 159 may begin generating A-CDSs in accordance with data shown in another row of Table 3. Other examples of an aggregator update message and other examples of the program instructions to use data in the aggregator update message are also possible.

Aggregator 159 is shown as being a part of RAE 114. Alternatively, aggregator 159 may be a device remote from RAE 114. DAS 110 may comprise one or more other aggregators in addition to aggregator 159. The placement of aggregator 159 and/or the one or more other aggregators within indoor premises 136 may vary depending on any of a variety of factors, such as an expected number of users for a given area of indoor premises 136. For example, indoor premises 136 may comprise a multi-storied building such that indoor premises 136 comprises one or more aggregators on each story (or other area) of indoor premises 136. Each aggregator in DAS 110 may aggregate combined digital signals in accordance with the data in Table 3.

The CDSs aggregated by aggregator 159 may represent digital signals for any of a variety of wireless service air interface protocols. As an example, the CDSs aggregated by aggregator 159 may represent digital signals of wireless service air interface protocols such as air interface protocols for CDMA, CDMA EVDO, GSM, Universal Mobile Telephony System (UMTS), Integrated Digital Enhance Network (iDEN), and WiMAX. Other examples of the air interface protocols are also possible.

Figure 2:
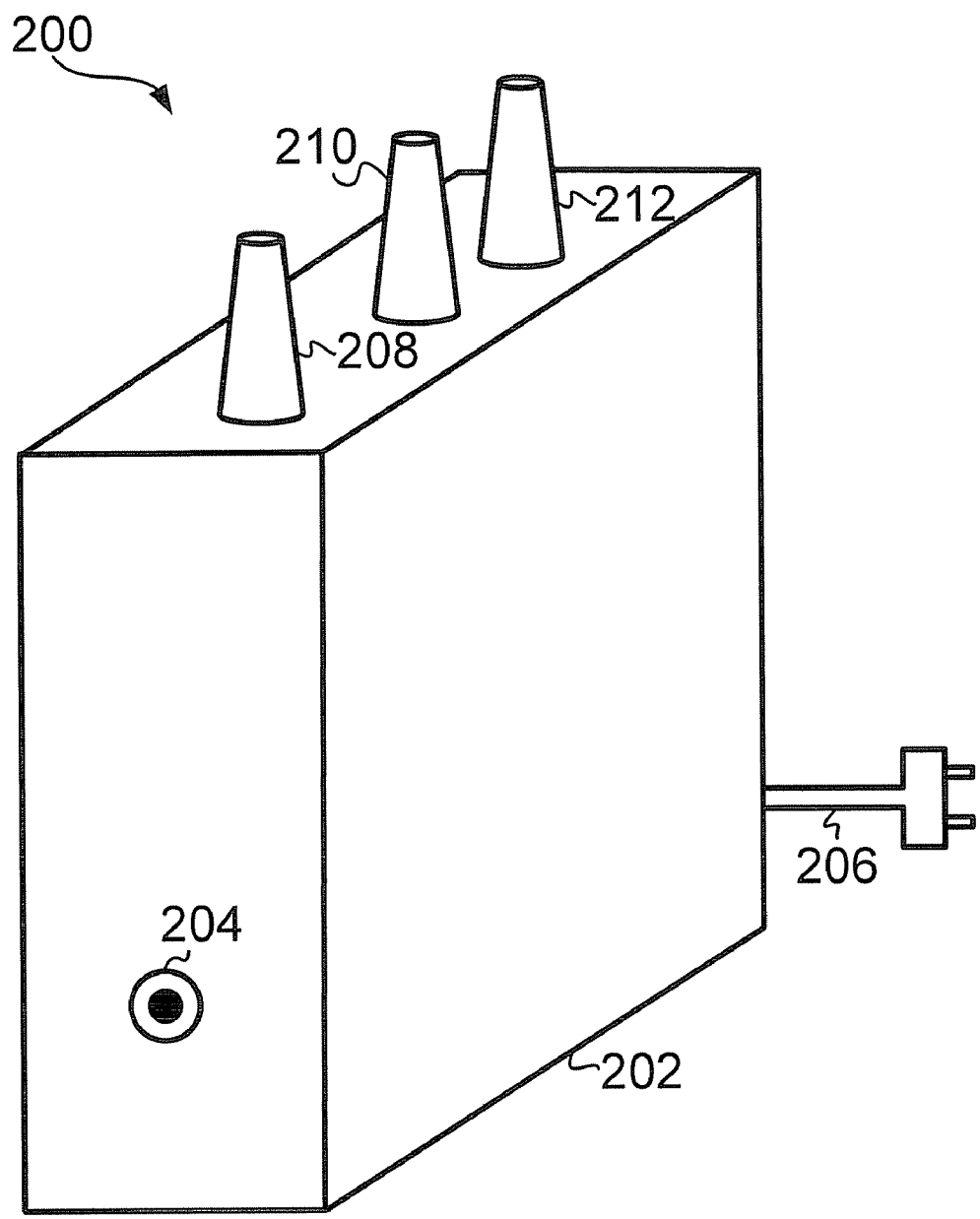
FIG. 2 is a drawing depicting an exemplary remote antenna entity.

Next, FIG. 2 is a drawing depicting details of an exemplary RAE 200. As shown in FIG. 2, RAE 200 includes a housing 202, an F-connector 204, a power line connector 206, and antennas 208, 210, 212. Alternatively, one or more of these RAE components (i.e., housing 202, F-connector 204, power line connector 206, and antennas 208, 210, 212) may be omitted from RAE 200. Additionally, RAE 200 may include any of the following RAE components: a signal conditioner, a UWB-T, an N-UWB-T, and an aggregator. One or more of RAEs 112, 114, 116, 118 may be arranged as RAE 200.

Housing 202 comprises a structure that covers, protects, and/or supports RAE components, such as F-connector 204 and antennas 208, 210, 212. The housing structure may be made of any material (e.g., plastic or metal) suitable for covering, protecting, and/or supporting RAE components. Housing 202 may include one or more seals to prevent particles (e.g., dust and water) from entering housing 202.

F-connector 204 may comprise a connector for connecting a coaxial cable of shared transport medium 138 to a coaxial cable leading to an N-UWB-T, such as N-UWB-T 168. The coaxial cable connected at F-connector 204 may comprise an RG-6/U coaxial cable, an RG-59/U coaxial cable, or another type of coaxial cable.

Power line connector 206 may comprise a connector and one or more conductors. As an example, the power line connector 206 may comprise a connector having three pins (e.g., a line pin, a neutral pin, and a ground pin) that connect to a power source (e.g., a wall outlet providing an electrical power signal of approximately 120 VAC and 60 Hz). One end of each of the one or more conductors may connect to a pin of power line connector 206 and another end of each of the one or more conductors may connect to any of a variety of elements within RAE 200. For example, the other ends of the one or more conductors may connect to an N-UWB-T, such as N-UWB-T 168. In this regard, N-UWB-T 168 may be arranged as a BPL modem that can demodulate an electrical power signal carried over a power line to the BPL modem so as to recover an N-UWB signal from the power signal. As another example, the other ends of the one or more conductors may connect to a power transformer that reduces a voltage level of an electrical power signal carried to the power line connector 206.

Antennas 208, 210 may be a part of or connect to a UWB-T, such as UWB-T 156. In particular, antenna 208 may comprise an antenna that transmits UWB signals, and antenna 210 may be an antenna that receives UWB signals. Alternatively, antenna 208 may comprise an antenna that transmits and receives UWB signals, such that antenna 210 may be omitted from RAE 200.

Antenna 212 may be part of or connect to an N-UWB-T, such as N-UWB-T 160. Antenna 212 may comprise an antenna that transmits and receives N-UWB signals. Alternatively, antenna 212 may comprise an antenna that transmits N-UWB signals, but does not receive N-UWB signals, such that RAE 200 comprises another antenna that receives N-UWB signals. Antennas 146, 154, 162 may be arranged as antenna 212.

Although FIG. 2 depicts antennas 208, 210, 212 extending outside of housing 200, a portion of antennas 208, 210, 212 may be contained within housing 200. Alternatively, one or more antennas 208, 210, and/or 212 may be contained entirely within housing 200.

3. EXEMPLARY OPERATION

The present invention provides for the generation and communication of combined digital signals and aggregated combined digital signals. The combined digital signals may be carried as payload of UWB signals and/or N-UWB signals in a forward-link direction or in a reverse-link direction. The aggregated combined digital signals may be carried as payload of UWB signals and/or N-UWB signals in a reverse-link direction.

a. Communication of a Signal Received at an N-UWB-T

Various communications may be carried out by an RAE, such as communications of a signal received at an N-UWB-T. For example, N-UWB-T 160 may receive an N-UWB signal carrying an analog baseband signal representing digital signals for multiple reverse-link communication channels and provide the received N-UWB signal to signal conditioner 158. The multiple reverse-link communication channels may be assigned to one or more WCDs, such as WCD 122 and the other WCDs 123. Signal conditioner 158 may recover the analog baseband signal from the N-UWB signal, generate a CDS from the analog baseband signal, generate a UWB signal carrying the CDS, and provide the UWB signal carrying the CDS to UWB-T 156. UWB-T 156 may transmit the UWB signal carrying the CDS representing the digital signals for multiple reverse-link communication channels to a UWB-T located within another RAE.

As another example, N-UWB-T 160 may receive an N-UWB signal carrying an analog baseband signal representing digital signals for multiple forward-link communication channels and provide the received N-UWB signal to signal conditioner 158. The N-UWB signal may be received from BTS 104, BTS-SC 108, or an N-UWB-T other than N-UWB-T 160. The multiple forward-link communication channels may be assigned to WCDs 120, 122, 124, 126 and the other WCDs 121, 123, 125, 127.

Signal conditioner 158 may recover the analog baseband signal from the N-UWB signal, modulate a carrier signal with the recovered analog baseband signal so as to generate another N-UWB signal carrying the analog baseband signal, and provide the other N-UWB signal to N-UWB-T 160. N-UWB-T 160 may transmit the other N-UWB signal carrying the analog baseband signal to one or more WCDs via air interface 130 so that the one or more WCDs receive an analog baseband signal representing the digital signals for multiple forward-link communication channels.

Additionally, signal conditioner 158 may (i) generate from the recovered analog baseband signal a CDS comprising data bits representing an amplitude of the analog baseband signal and a power level measurement of the analog baseband signal, (ii) modulate a carrier signal with the CDS so as to generate a UWB signal carrying the CDS, and (iii) provide the UWB signal carrying the CDS to UWB-T 156. UWB-T 156 may transmit the UWB signal carrying the CDS to a UWB-T of another RAE.

Figure 3:
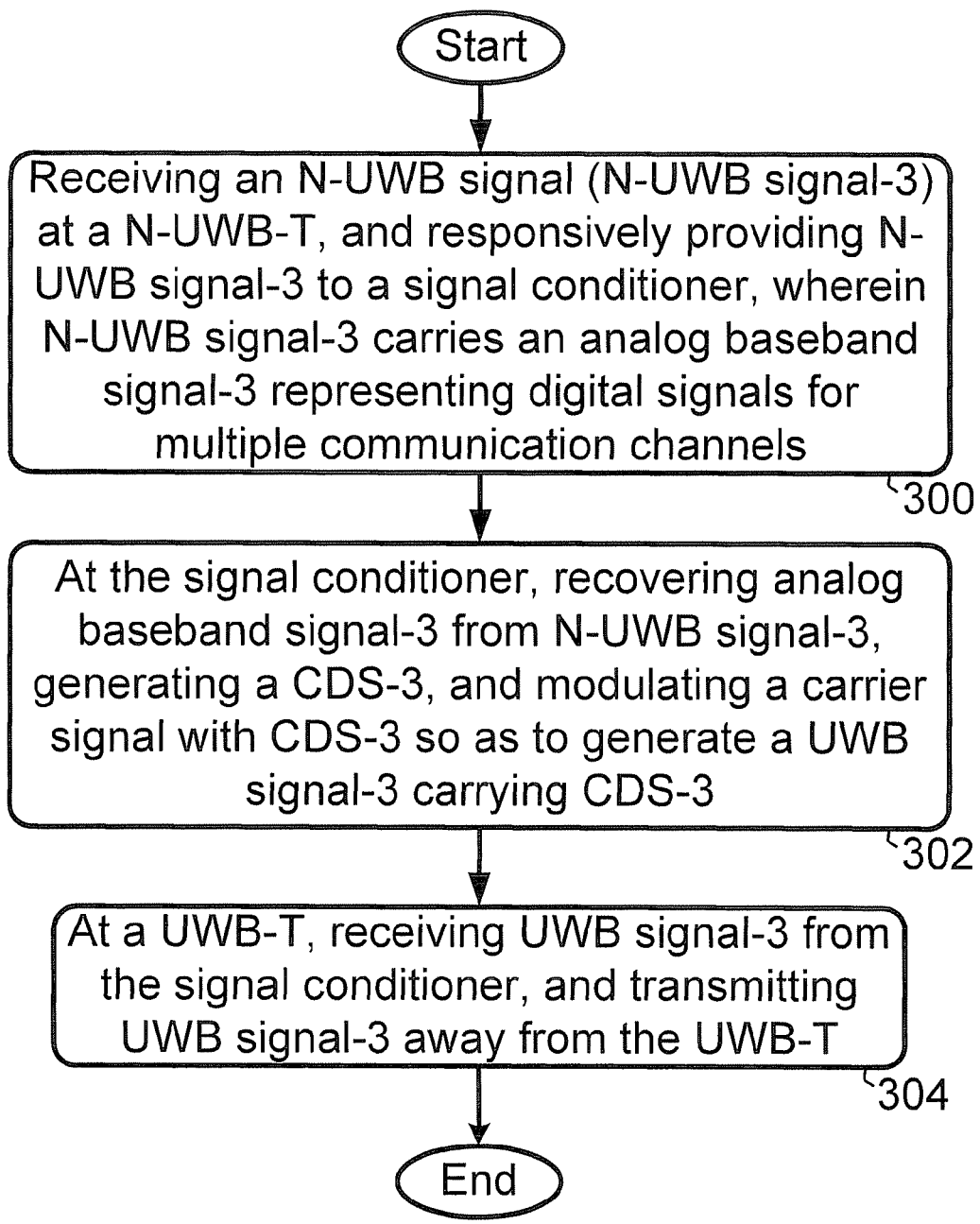
FIG. 3 is a flow chart depicting a set of functions that may be carried out with an exemplary embodiment so as to communicate a signal received at a non-ultra-wideband transceiver of a remote antenna entity.

FIG. 3 is a flow chart provided to illustrate some functions that may be carried out to perform communications of a signal received at an N-UWB-T. Communications of a signal received at an N-UWB-T may be carried out for performing communications in a forward-link direction or in a reverse-link direction. For purposes of this description, the suffixes "-3" and "-3A" are used to designate various signals referred to in describing FIG. 3.

As shown in FIG. 3, block 300 includes receiving an N-UWB signal (hereinafter "N-UWB signal-3") at an N-UWB-T (e.g., N-UWB-T 160), and responsively providing N-UWB signal-3 to a signal conditioner (e.g., signal conditioner 158). N-UWB signal-3 carries an analog baseband signal (hereinafter "analog baseband signal-3) that represents digital signals for multiple communication channels.

In one case, N-UWB-T 160 may receive N-UWB signal-3 from one or more WCDs, such as WCD 122 and the other WCDs 123. In this regard, N-UWB signal-3 may comprise an electrical signal generated at antenna 162 as a result of N-UWB signals transmitted from the one or more WCDs providing an electro-magnetic field at the antenna 162. In accordance with this case, analog baseband signal-3 may represent digital signals having a destination of BTS 104.

In another case, N-UWB-T 160 may receive N-UWB signal-3 from an N-UWB-T of another RAE, such as N-UWB-T 144. In accordance with this case, analog baseband signal-3 may represent digital signals having a destination of WCDs 120, 122, 124, 126 and the other WCDs 121, 123, 125, 127, or a destination of BTS 104.

In yet another case, N-UWB-T 160 may receive N-UWB signal-3 from BTS 104 via air interface 128. In this regard, RAE 114 may be located at a location within indoor premises 136 such that RAE 114 may receive N-UWB signals transmitted via air interface 128. In accordance with this case, analog baseband signal-3 may represent digital signals having a destination of WCDs 120, 122, 124, 126 and the other WCDs 121, 123, 125, 127. FIG. 3 does not show the air interface 128 between BTS 104 and RAE 114 or any other RAEs for clarity of the figure.

Next, block 302 includes at the signal conditioner 158, recovering analog baseband signal-3 from N-UWB signal-3, generating a CDS (hereinafter "CDS-3"), and modulating a carrier signal with CDS-3 so as to generate a UWB signal-3 carrying CDS-3.

Signal conditioner 158 may recover analog baseband signal-3 by demodulating N-UWB signal-3. In this regard, signal conditioner 158 may comprise a modem to carry out demodulation of N-UWB signal-3.

Signal conditioner 158 may generate CDS-3 using any of a variety of methods. As an example, signal conditioner 158 may generate CDS-3 by (i) encoding the MSB of CDS-3 with a value of zero if the amplitude of analog signal-3 is positive at the time a power level measurement of analog signal-3 is made or a value of one if the amplitude of analog signal-3 is negative at the time a power level measurement of analog signal-3 is made, and (ii) encoding the LSBs of CDS-3 with the binary bit pattern representing the power level measurement of analog baseband signal-3. Alternatively, signal conditioner 158 may encode the MSB of CDS-3 with a value of one if the amplitude of analog signal-3 is positive or a value of zero if the amplitude of analog signal-3 is negative.

CDS-3 may be generated in accordance with the data shown in Table 2. For instance, if analog baseband signal-3 represents digital signals for 63 wireless service communication signals, then signal conditioner 158 may generate CDS-3 to have seven bits (i.e., X=7). Other examples of generating CDS-3 are also possible.

Signal conditioner 158 may generate or receive a carrier signal and thereafter modulate the carrier signal with CDS-3 so as to generate UWB signal-3. The modem of signal conditioner 158 may carry out modulation of the carrier signal. Thereafter, signal conditioner 158 may provide UWB signal-3 to UWB-T 156.

A carrier signal may comprise a UWB signal that can be modulated with information (e.g., a CDS or an A-CDS) so as to generate a UWB signal carrying the information modulated onto the carrier signal. Alternatively, a carrier signal may comprise an N-UWB signal that can be modulated with information (e.g., a CDS or an analog baseband signal representing digital signals) so as to generate an N-UWB signal carrying the information modulated onto the carrier signal.

Next, block 304 includes at a UWB-T (e.g., UWB-T 156), receiving UWB signal-3 from the signal conditioner 158, and transmitting UWB signal-3 away from UWB-T 156.

UWB signal-3 transmitted from UWB-T 156 may be received by a UWB-T of another RAE, such as UWB-T 140 of RAE 116 or UWB-T 164 of RAE 112. After receiving UWB signal-3, the RAE that receives UWB signal-3 may communicate the information carried by UWB signal-3 (i.e., the digital signals represented by CDS-3). Details pertaining to communicating a UWB signal received at a UWB-T are described hereinafter.

Additionally or alternatively, after signal conditioner 158 receives N-UWB signal-3 from N-UWB-T 156, signal conditioner 158 may (i) demodulate N-UWB signal-3 so as to recover analog baseband (ii) modulate a carrier signal with analog baseband signal-3 so as to generate an N-UWB signal (hereinafter "N-UWB signal-3A") carrying analog baseband signal-3, and (iii) provide N-UWB signal-3A to N-UWB-T 156. N-UWB-T 156 may transmit N-UWB signal-3A for reception at one or more other devices, such as one or more WCDs, another N-UWB-T, and/or BTS 104.

b. Communication of a Signal Received at a UWB-T

The communications carried out by an RAE may also include communications of a signal received at a UWB-T. For example, UWB-T 156 may receive a UWB signal carrying a CDS representing digital signals for multiple forward-link communication channels and then provide the received UWB signal to signal conditioner 158. Signal conditioner 158 may recover the CDS, generate an analog baseband signal representing the digital signals represented by the CDS, modulate a carrier signal with the analog baseband signal so as to generate an N-UWB signal carrying the analog baseband signal, and provide the N-UWB signal to N-UWB-T 160. N-UWB-T 160 may transmit the N-UWB signal carrying the analog baseband signal to one or more WCDs via air interface 130. Signal conditioner 158 may also generate another UWB signal carrying the CDS and provide the other UWB signal carrying the CDS to UWB-T 156. UWB-T 156 may transmit the other UWB signal carrying the CDS to a UWB-T of another RAE.

As another example, UWB-T 164 may receive a UWB signal carrying a CDS representing digital signals for multiple reverse-link communication channels and then provide the received UWB signal to signal conditioner 166. Signal conditioner 166 may recover the CDS, generate an analog baseband signal representing the digital signals represented by the CDS, modulate a carrier signal with the analog baseband signal so as to generate an N-UWB signal carrying the analog baseband signal, and provide the N-UWB signal to N-UWB-T 168. N-UWB-T 168 may then transmit the N-UWB signal carrying the analog baseband signal to BTS-SC 108 via shared transport medium 138.

As yet another example, UWB-T 140 may receive a UWB signal carrying a CDS representing digital signals for multiple reverse-link communication channels and then provide the received UWB signal to signal conditioner 142. UWB-T 140 may receive the UWB signal from UWB-T 148. Signal conditioner 142 may recover the CDS representing digital signals for multiple reverse-link communication channels, generate another UWB signal carrying the CDS, and provide the other UWB signal carrying the CDS to UWB-T 140. UWB-T 140 may then transmit the other UWB signal carrying the CDS to UWB-T 156.

Figure 4:
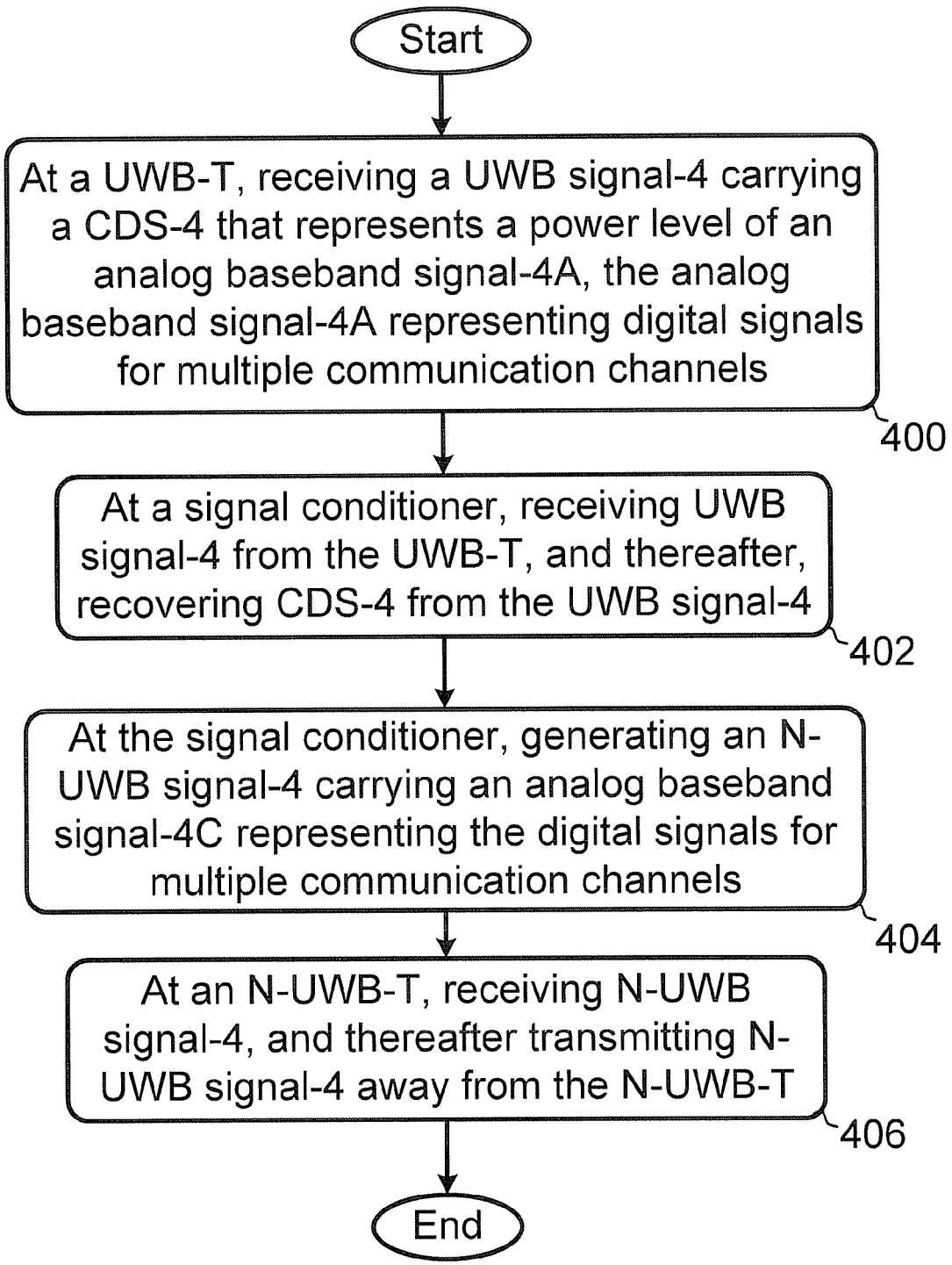
FIG. 4 is a flow chart depicting a set of functions that may be carried out with an exemplary embodiment so as to communicate a signal received at an ultra-wideband transceiver of a remote antenna entity.

FIG. 4 is a flow chart provided to illustrate some functions that may be carried out to perform communications of a UWB signal received at a UWB-T. Communications of a UWB signal received at a UWB-T may be carried out for performing communications in a forward-link direction or in a reverse-link direction.

The functions shown in FIG. 4 may be carried out before the functions shown in FIG. 3 are performed, after the functions shown in FIG. 3 have been performed, and/or while any of the functions shown in FIG. 3 are being performed. The functions shown in FIG. 4 may be carried out at any RAE of DAS 110. For purposes of this description, the suffixes "-4", "-4A", "-4B", and "-4C" are used to designate various signals referred to in describing FIG. 4.

As shown in FIG. 4, block 400 includes at a UWB-T (e.g., UWB-T 156), receiving a UWB signal-4 carrying a CDS-4 that represents a power level measurement of an analog baseband signal-4A. UWB signal-4 may be transmitted to UWB-T 156 from UWB-T 140 or from another UWB-T. Analog baseband signal-4A represents digital signals for multiple wireless communication channels, which may be forward-link communication channels or reverse-link communication channels.

UWB signal-4 may carry an analog baseband signal-4B. Analog baseband signal-4B may carry a set of data packets having CDS-4 as a payload.

CDS-4 may include a number of bits equal to X in accordance with the description of Table 2. Of these X bits, CDS-4 may comprise LSBs having a binary bit pattern representing the power level measurement of analog baseband signal-4A, and an MSB indicating whether an amplitude of analog baseband signal-4A is positive or negative at the time the power level measurement is made.

CDS-4 may be generated at various signal conditioners. For example, CDS-4 may be generated at signal conditioner 142 of RAE 116. In this regard, N-UWB-T 144 may receive analog baseband signal-4A at antenna 146, and then provide analog baseband signal-4A to signal conditioner 142. Thereafter, signal conditioner 142 may encode CDS-4 with LSBs based on the power level measurement of analog baseband signal-4A and an MSB based on the amplitude of analog baseband signal-4A. In accordance with this example, analog baseband signal-4A may represent digital signals for multiple reverse-link communication channels assigned to WCD 124 and the other WCDs 125.

As another example, CDS-4 may be generated at BTS-SC 108 after BTS-SC 108 receives analog baseband signal-4A from an N-UWB signal transmitted to BTS-SC 108 via antenna feed 135. In accordance with this example, analog baseband signal-4A may represent digital signals for multiple forward-link communication channels assigned to WCDs 120, 122, 124, 126 and the other WCDs 121, 123, 125, 127.

Next, block 402 includes at a signal conditioner (e.g., signal conditioner 158), receiving UWB signal-4 from UWB-T 156, and thereafter recovering CDS-4 from UWB signal-4. Recovering CDS-4 may occur in various ways. For example, recovering CDS-4 may include demodulating UWB signal-4 so as to recover analog baseband signal-4B, demodulating analog baseband signal-4B so as to recover the set of data packets having CDS-4 as a payload, and then de-packetizing the data packets so as to recover the payload (i.e., CDS-4). Other examples of recovering CDS-4 from UWB signal-4 are also possible.

After recovering CDS-4, signal conditioner 158 may generate an analog baseband signal-4C from CDS-4. Analog baseband signal-4C may consist of an analog signal having a positive or negative amplitude as indicated by the MSB of CDS-4 and a power level measurement as indicated by the LSBs of CDS-4. Preferably, analog baseband signal-4C will be substantially identical to analog baseband signal-4A, such that analog baseband signal-4C and analog baseband signal-4A both represent the digital signals for multiple communication channels.

Next, block 404 includes at the signal conditioner 158, generating an N-UWB signal-4 carrying an analog baseband signal representing the digital signals for multiple communication channels (hereinafter "analog baseband signal-4C"). Signal conditioner 158 may generate N-UWB signal-4 by modulating a carrier signal with the analog baseband signal-4C.

Next, block 406 includes at an N-UWB-T (e.g., N-UWB-T 160), receiving N-UWB signal-4, and thereafter, transmitting N-UWB signal-4 away from the N-UWB-T 160. The N-UWB signal-4 transmitted from N-UWB-T 160 may be received by one or more WCDs, such as WCD 124 and the other WCDs 125. In this way, the one or more WCDs may receive an analog baseband signal (representing the digital signals for multiple communication channels) that is identical to or substantially identical to analog baseband signal-4A.

Additionally, after recovering CDS-4 at block 402, signal conditioner 158 may modulate a carrier signal with CDS-4 so as to generate a UWB signal-4A carrying CDS-4. Thereafter, signal conditioner 158 may provide UWB signal-4A to UWB-T 156 for transmission, in turn, of UWB signal-4A away from UWB-T 156. UWB-T signal-4A may be received at a UWB-T of another RAE that then carries out the functions of FIG. 4 to UWB signal-4A.

c. Aggregation of Combined Digital Signals

Aggregation of multiple combined digital signals representing digital signals for multiple reverse-link communication channels may be carried out so as to reduce the bandwidth necessary to transmit the combined digital signals. For example, as shown in Table 2, the bandwidth used to transmit one eight-bit CDS is 9.8206 Mbps. Transmitting four eight-bit CDSs individually would thus require 39.2824 Mbps (i.e., 9.8206 Mbps times 4). However, as shown in Table 3, the bandwidth used to transmit four eight-bits CDSs aggregated into an aggregated CDS (A-CDS) is 12.288 Mbps.

FIG. 5 is a flow chart provided to illustrate some functions that may be carried out for aggregating multiple CDSs so as to generate an A-CDS, and for communicating a signal carrying an A-CDS. Two or more of the functions shown in FIG. 5 may be carried out sequentially and/or two or more of the functions may be carried out at substantially the same time. Further, one or more of the functions shown in FIG. 5 may be omitted. For purposes of this description, the suffixes "-5", "-5A", "-5B", "-5C", "-5D" are used to designate various signals referred to in describing FIG. 5.

The multiple CDSs to be aggregated may be generated at multiple RAEs. For example, RAE 116 may generate a CDS (hereinafter "CDS-5A") that represents digital signals for multiple reverse-link communication channels assigned to WCD 124 and the other WCDs 125. UWB-T 140 may transmit a UWB signal-5A carrying an analog baseband signal-5A that represents a set of data packets-5A. The data packets-5A may carry CDS-5A as a payload. UWB-T 156 may receive UWB signal-5A. CDS-5A may comprise an MSB and LSBs as described with respect to CDS-1 and Table 2.

Similarly, RAE 118 may generate a CDS (hereinafter "CDS-5B") that represents digital signals for multiple reverse-link communication channels assigned to WCD 126 and the other WCDs 127. UWB-T 148 may transmit a UWB signal-5B carrying an analog baseband signal-5B that represents a set of data packets-5B. The data packets-5B may carry CDS-5B as a payload. UWB-T 156 may receive UWB signal-5B. CDS-5B may comprise an MSB and LSBs as described with respect to CDS-1 and Table 2.

Alternatively or additionally, a CDS to be aggregated may be generated at a signal conditioner located within an RAE that includes the aggregator that will aggregate the CDS. For example, signal conditioner 158 of RAE 114 may generate a CDS representing digital signals for multiple reverse-link communication channels assigned to WCD 122 and the other WCDs 123. Thereafter, aggregator 159 may aggregate the CDS generated at signal conditioner 158 with CDS-5A and/or CDS-5B.

As shown in FIG. 5, block 500 includes recovering CDS-5A and recovering CDS-5B. Recovery of CDS-5A and CDS-5B may be carried out at a signal conditioner (e.g., signal conditioner 158). As an example, signal conditioner 158 may recover CDS-5A by (i) demodulating UWB signal-5A so as to recover analog baseband signal-5A, (ii) demodulating analog baseband signal-5A so as to recover data packets-5A, and (iii) de-packetizing data packet-5A. A similar method may be used to recover CDS-5B from UWB signal-5B. After recovering CDS-5A, signal conditioner 158 may provide CDS-5A to aggregator 159 and after recovering CDS-5B, signal conditioner 158 may provide CDS-5B to aggregator 159.

Next, block 502 includes aggregating CDS-5A and CDS-5B so as to generate an A-CDS-5. Aggregation of CDS-5A and CDS-5B may be carried out at aggregator 159. Aggregator 159 may aggregate CDS-5A and CDS-5B in accordance with data shown in Table 3. For example, if CDS-5A and CDS-5B each comprise eight data bits (i.e., X=8), then aggregator 159 may aggregate CDS-5A and CDS-5B in accordance with the data shown in the second row of Table 3. In this way, A-CDS-5 comprises 10 data bits (i.e., N+X data bits) and uses 12.288 Mbps of bandwidth for transmission of A-CDS-5.

Aggregator 159 may generate A-CDS-5 by adding the data bits of CDS-5A and CDS-5B and, if the number of data bits of the sum is less than N+X bits, inserting up to N bits in the MSB position of the A-CDS-5. For example, if CDS-5A comprises the data bits "00110110" and CDS-5B comprises the data bits "01100010," aggregator 159 may add "00110110" (i.e., the bits of CDS-5A) and "01100010" (i.e., the bits of CDS-5B) to obtain the sum of "10011000" and then insert two "0" bits in the MSB position such that A-CDS-5 becomes "001001000." In this way, the number of bits of A-CDS-5 equals N+X bits (e.g., 10 bits).

As another example, CDS-5A may comprise the data bits "00000010" (i.e., an MSB indicating the analog baseband signal from which CDS-5A is generated has a positive amplitude and seven LSBs equal to a decimal value of 2 to indicate a power level of the analog baseband signal from which CDS-5A is generated) and CDS-5B may comprise the data bits "11111111" (i.e., an MSB indicating the analog baseband signal from which CDS-5B is generated has a negative amplitude and seven LSBs equal to a decimal value of 127 to indicate the power level of the analog baseband signal from which CDS-5B is generated). To obtain the sum of a positive binary number and a negative binary number, aggregator 159 may (i) determine that the two's complement of the seven least significant bits of CDS-5B (i.e., "1111111") is "0000001," (ii) add this two's complement value "0000001" to the seven LSBs of CDS-5A (i.e., "0000010") to obtain the sum of "0000011," (iii) determine that the two's complement of the sum "0000011" is "1111101" (i.e., 125 decimal), and (iv) insert an MSB of 1 to indicate the sum is negative and insert two "0" filler bits after the MSB so that the number of bits of A-CDS-5 equals the selected value of N+X (e.g., 10). Other examples of aggregating CDS-5A and CDS-5B are also possible.

Next, block 504 includes modulating a carrier signal-5A with A-CDS-5 so as to generate a UWB signal-5 carrying A-CDS-5. As an example, aggregator 159 may provide A-CDS-5 to signal conditioner 158 and signal conditioner 158 may generate carrier signal-5A. In this way, modulation of carrier signal-5A may be carried out at signal conditioner 158. After generating UWB-5, signal conditioner 158 may provide UWB-5 to UWB-T 156. As another example, aggregator 159 may provide A-CDS-5 to UWB-T 156 and UWB-T 156 may generate carrier signal-5A. In this way, modulation of carrier signal-5A may be carried out at UWB-T 156.

Next, block 506 includes transmitting UWB signal-5 away from a UWB-T (e.g., UWB-T 156) for reception at least one other UWB-T (e.g., UWB-T 140, UWB-T 148, or UWB-T 164). If UWB-T 140 and/or UWB-T 148 receive UWB signal-5, RAE 116 and/or RAE 118 may recover A-CDS-5 from UWB signal-5, generate another UWB signal representing A-CDS-5, and transmit the other UWB signal representing A-CDS-5 to another UWB-T for subsequent communications of A-CDS-5 in a reverse-link direction towards BTS 104.

If UWB-T 164 receives UWB signal-5, UWB-T 164 may provide UWB signal-5 to signal conditioner 166. Signal conditioner 166 may recover A-CDS-5 from UWB signal-5, generate an analog baseband signal representing A-CDS-5, and modulate a carrier signal-5C with the analog baseband signal representing A-CDS-5 so as generate an N-UWB signal carrying the analog baseband signal representing A-CDS-5. N-UWB-T 168 may transmit the N-UWB signal carrying the analog baseband signal representing A-CDS-5 to BTS-SC 108 via shared transport medium 138. BTS-SC 108 may recover the analog baseband signal representing A-CDS-5 from the N-UWB signal, and then transmit the analog baseband signal representing A-CDS-5 to BTS 104 via antenna feed 135.

Next, block 508 includes modulating a carrier signal-5B with A-CDS-5 so as to generate an N-UWB signal-5 carrying A-CDS-5. As an example, aggregator 159 may provide A-CDS-5 to signal conditioner 158 and signal conditioner 158 may generate carrier signal-5B. In this way, modulation of carrier signal-5B may be carried out at signal conditioner 158. After generating N-UWB-5, signal conditioner 158 may provide N-UWB-5 to N-UWB-T 160. As another example, aggregator 159 may provide A-CDS-5 to N-UWB-T 160 and N-UWB-T 160 may generate carrier signal-5B. In this way, modulation of carrier signal-5B may be carried out at N-UWB-T 160.

Next, block 510 includes transmitting N-UWB signal-5 away from an N-UWB-T (e.g., N-UWB-T 160) for reception at least one other N-UWB-T (e.g., N-UWB-T 144, N-UWB-T 152, or N-UWB-T 168). If N-UWB-T 144 and/or N-UWB-T 152 receive N-UWB signal-5, RAE 116 and/or RAE 118 may recover A-CDS-5 from N-UWB signal-5, generate another N-UWB signal carrying A-CDS-5, and transmit the other N-UWB signal carrying A-CDS-5 to another N-UWB-T for subsequent communications of A-CDS-5 in a reverse-link direction towards BTS 104.

If N-UWB-T 168 receives N-UWB signal-5, N-UWB-T 168 may provide N-UWB signal-5 to signal conditioner 166. Signal conditioner 166 may recover A-CDS-5 from N-UWB signal-5, generate an analog baseband signal representing A-CDS-5, and modulate a carrier signal-5D with the analog baseband signal representing A-CDS-5 so as to generate an N-UWB signal carrying the analog baseband signal representing A-CDS-5. N-UWB-T 168 may transmit the N-UWB signal carrying the analog baseband signal representing A-CDS-5 to BTS-SC 108 via shared transport medium 138.

BTS-SC 108 may recover the analog baseband signal representing A-CDS-5 from the N-UWB signal, recover A-CDS-5, generate an analog baseband signal, based on A-CDS-5, that represents the digital signals for multiple reverse-link communication channels assigned to WCD 126 and the other WCDs 127 and the multiple reverse-link communication channels assigned to WCD 122 and the other WCDs 123. Thereafter, BTS-SC 108 may transmit the analog baseband signal based on A-CDS-5 to BTS 104 via antenna feed 135.

4. CONCLUSION

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method comprising:
   at a first signal conditioner located at a first remote antenna entity, receiving from a first transceiver, a first non-ultra-wideband signal carrying a first analog baseband signal,
   wherein the first analog baseband signal represents digital signals for a first set of wireless communication channels,
   wherein the digital signals are converted to the first analog baseband signal at a clock rate interval for an air interface protocol defining the first set of wireless communication channels,
   at the first signal conditioner, (i) demodulating the first non-ultra-wideband signal so as to recover the first analog baseband signal, (ii) making power level measurements of the recovered first analog baseband signal at the clock rate interval, (iii) generating a first combined digital signal comprising data bits that represent a power level measurement of the recovered first analog baseband signal measured at the clock rate interval, and (iv) modulating a first carrier signal with the first combined digital signal so as to generate a first ultra-wideband signal carrying the first combined digital signal; and
   at the second transceiver, receiving from the first signal conditioner the first ultra-wideband signal, and thereafter transmitting the first ultra-wideband signal away from the second transceiver.

2. The method of claim 1,
   wherein the first signal conditioner is connected to the first transceiver and to the second transceiver,
   wherein the first transceiver and the second transceiver are located at the first remote antenna entity,
   wherein the first set of wireless communication channels are assigned by a base transceiver station to one or more wireless communication devices, and
   wherein the first remote antenna entity is one of a plurality of remote antenna entities of a distributed antenna system.

3. The method of claim 2, wherein the first transceiver is a non-ultra-wideband transceiver and the second transceiver is an ultra-wideband transceiver.

4. The method of claim 1, further comprising:
   receiving at the second transceiver a second ultra-wideband signal,
   wherein the second ultra-wideband signal carries a second combined digital signal comprising data bits that represents a power level measurement of a second analog baseband signal measured at the clock rate interval of the air interface protocol, wherein the second analog baseband signal represents digital signals for a second set of wireless communication channels comprising forward-link communication channels assigned by a base transceiver station to one or more wireless communication devices, at the first signal conditioner, (i) receiving the second ultra-wideband signal from the second transceiver, (ii) recovering the second combined digital signal from the second ultra-wideband signal, (iii) generating a third analog baseband signal from the second combined digital signal, wherein the third analog baseband signal represents the digital signals for the second set of wireless communication channels, and (iv) modulating a second carrier signal with the third analog baseband signal so as to generate a second non-ultra-wideband signal, wherein the second non-ultra-wideband signal carries the third analog baseband signal, and at the first transceiver, receiving the second non-ultra-wideband signal from the first signal conditioner, and thereafter transmitting away from the first transceiver the second non-ultra-wideband signal for reception at the one or more wireless communication devices.

5. The method of claim 1, further comprising:

receiving at the second transceiver a second ultra-wideband signal, wherein the second ultra-wideband signal carries a second combined digital signal comprising data bits that represents a power level measurement of a second analog baseband signal measured at the clock rate interval of the air interface protocol, wherein the second analog baseband signal represents digital signals for a second set of wireless communication channels comprising reverse-link communication channels assigned by a base transceiver station to one or more wireless communication devices, at the first signal conditioner, receiving the second ultra-wideband signal from the second transceiver, recovering the second combined digital signal from the second ultra-wideband signal, modulating a second carrier signal with the second combined digital signal so as to generate a second non-ultra-wideband signal, wherein the second non-ultra-wideband signal carries the second combined digital signal, and at the first transceiver, receiving the second non-ultra-wideband signal from the first signal conditioner, and thereafter transmitting the second non-ultra-wideband signal away from the first transceiver.

6. The method of claim 5, wherein after transmitting the second non-ultra-wideband signal away from the first transceiver, the second non-ultra-wideband signal is transmitted via a shared transport medium to a base transceiver station signal conditioner that connects to the base transceiver station, wherein the base transceiver station signal conditioner (i) recovers the second combined digital signal from the second non-ultra-wideband signal, (ii) generates a third analog baseband signal, wherein the third analog baseband signal represents the digital signals for the second set of wireless communication channels, (iii) modulates a third carrier signal with the third analog baseband signal so as to generate a signal carrying the third analog baseband signal, and (iv) transmits the signal carrying the third analog baseband signal to an antenna feed of the base transceiver station.

7. The method of claim 6, wherein the shared transport medium comprises a broadband wireless transport medium selected from the group consisting of (i) a free space optics transport medium, (ii) a millimeter wave transport medium, and (iii) a microwave radio transport medium.

8. The method of claim 6, wherein the shared transport medium comprises a broadband wireline transport medium selected from the group consisting of (i) a hybrid fiber coaxial (HFC) transport medium, (ii) a broadband over electrical power line transport medium, (iii) an optical fiber transport medium, (iv) a Digital Subscriber Line (DSL) transport medium, and (v) a coaxial cable transport medium.

9. The method of claim 1, wherein generating the first combined digital signal further comprises:

encoding least significant bits of the first combined digital signal with a binary bit pattern representing the power level measurement of the recovered first analog baseband signal; and assigning a most significant bit of the first combined digital signal a value of zero if an amplitude of the first analog baseband signal is positive or a value of one if the amplitude of the first analog baseband signal is negative.

10. The method of claim 1, wherein the first ultra-wideband signal comprises a signal arranged according to a protocol selected from the group consisting of: (i) a direct sequence ultra-wideband protocol, and (ii) a multi-band orthogonal frequency division ultra-wideband protocol.

11. The method of claim 1, wherein the first ultra-wideband signal comprises a signal selected from the group consisting of (i) a signal having a fractional bandwidth greater than 0.25, (ii) a signal that occupies 500 MHz or more of a frequency band, (iii) a signal having a −10 dB bandwidth in a frequency band between 3.1 GHz and 10.6 GHz, and (iv) a signal in a frequency band within a bandwidth designated by the Federal Communications Commission (FCC) for use by ultra-wideband signals, and wherein the first non-ultra-wideband signal comprises a signal selected from the group consisting of (i) a signal having a fractional bandwidth less than or equal to 0.25, (ii) a signal that occupies less than or equal to 500 MHz of a frequency band, (iii) a signal having a −10 dB bandwidth outside of the frequency band between 3.1 GHz and 10.6 GHz, and (iv) a signal in a frequency band within a bandwidth not designated by the FCC for use by ultra-wideband signals.

12. The method of claim 1, wherein the first set of wireless communication channels comprises reverse-link communication channels assigned by a base transceiver station to one or more wireless communication devices, and wherein the first non-ultra-wideband signal is received at the first transceiver from the one or more wireless communication devices transmitting the digital signals over the first set of wireless communication channels.

13. The method of claim 1, wherein the first set of wireless communication channels comprises forward-link communication channels assigned by a base transceiver station to one or more wireless communication devices, and wherein the first non-ultra-wideband signal is transmitted to the first transceiver from the base transceiver station.

14. The method of claim 1, wherein the first remote antenna entity comprises a housing, wherein the first signal conditioner, at least a portion of the first transceiver, and at least a portion of the second transceiver are all located within the housing, and wherein the first remote antenna entity is located within an indoor premises.

15. The method of claim 1, further comprising:
receiving at the second transceiver (i) a second ultra-wideband signal carrying a second combined digital signal, and (ii) a third ultra-wideband signal carrying a third combined digital signal;
at the first signal conditioner, receiving the second ultra-wideband signal from the second transceiver and thereafter recovering the second combined digital signal from the second ultra-wideband signal;
at the first signal conditioner, receiving the third ultra-wideband signal from the second transceiver and thereafter recovering the third combined digital signal from the third ultra-wideband signal; and
at an aggregator, receiving from the first signal conditioner the second combined digital signal and the third combined digital signal and thereafter aggregating the second combined digital signal and the third combined digital signal to form a first aggregated combined digital signal representing the second combined digital signal and the third combined digital signal,
wherein the second combined digital signal comprises data bits representing a power level measurement of a second analog baseband signal measured at the clock rate interval,
wherein the second analog baseband signal represents digital signals carried over a first set of reverse-link communication channels between a second remote antenna entity and a first set of one or more wireless communication devices,
wherein the third combined digital signal comprises data bits representing a power level measurement of a third analog baseband signal measured at the clock rate interval, and
wherein the third analog baseband signal represents digital signals carried over a second set of reverse-link communication channels between a third remote antenna entity and a second set of one or more wireless communication devices.

16. The method of claim 1,
wherein the first signal conditioner comprises an aggregator,
the method further comprising:
receiving at the aggregator a second combined digital signal and a third combined digital signal,
wherein the second combined digital signal comprises data bits representing a power level measurement of a second analog baseband signal measured at the clock rate interval,
wherein the second analog baseband signal represents digital signals for a first set of reverse-link communication channels,
wherein the third combined digital signal comprises data bits representing a power level measurement of a third analog baseband signal measured at the clock rate interval,
wherein the third analog baseband signal represents digital signals for a second set of reverse-link communication channels,
at the aggregator, aggregating the second combined digital signal and the third combined digital signal to form an aggregated combined digital signal;
modulating a second carrier signal with the aggregated combined digital signal so as to generate a second non-ultra-wideband signal, wherein the second non-ultra-wideband signal carries the aggregated combined digital signal; and
transmitting away from the first transceiver the second non-ultra-wideband signal carrying the aggregated combined digital signal for reception of the second non-ultra-wideband signal at least one other non-ultra-wideband transceiver.

17. The method of claim 16,
wherein the first remote antenna entity comprises the first transceiver, the second transceiver, the first signal conditioner, and the aggregator,
wherein a second remote antenna entity comprises a second signal conditioner,
wherein the second combined digital signal is generated at the second signal conditioner,
wherein a third remote antenna entity comprises a third signal conditioner, and
wherein the third combined digital signal is generated at the third signal conditioner.

18. The method of claim 1,
wherein the first set of wireless communication channels are forward-link communication channels,
wherein a second remote antenna entity receives the first ultra-wideband signal, recovers the first combined digital signal from the first ultra-wideband signal, converts the first combined digital signal into a second analog baseband signal that represents the digital signals carried over the first set of wireless communication channels, and transmits a second non-ultra-wideband signal away from the second remote antenna entity,
wherein the second non-ultra-wideband signal carries the second analog baseband signal to one or more wireless communication devices.

19. The method of claim 1,
wherein the first set of wireless communication channels are reverse-link communication channels,
wherein a second remote antenna entity receives the first ultra-wideband signal, recovers the first combined digital signal from the first ultra-wideband signal, creates a set of data packets having the recovered first combined digital signal as a payload, and transmits the set of data packets to a base transceiver station signal conditioner connected to a base transceiver station, and
wherein the base transceiver station signal conditioner recovers the first combined digital signal from the set of data packets, converts the recovered first combined digital signal into a second analog baseband signal that represents the digital signals carried over the first set of wireless communication channels, and transmits the second analog baseband signals to the base transceiver station.

20. A remote antenna entity comprising:
a first transceiver for receiving and transmitting ultra-wideband signals;
a second transceiver for receiving and transmitting non-ultra-wideband signals; and
a signal conditioner connected to the first transceiver and to the second transceiver,
wherein the second transceiver provides to the signal conditioner a non-ultra-wideband signal received at the second transceiver,
wherein the non-ultra-wideband signal carries a first analog baseband signal representing digital signals for multiple wireless communication channels,
wherein the digital signals are converted to the first analog baseband signal at a clock rate interval for an air interface protocol defining the multiple wireless communication channels, wherein the signal conditioner: (i) demodulates the non-ultra-wideband signal so as to recover the first analog baseband signal, (ii) makes power level measurements of the recovered first analog baseband signal at the clock rate interval, (iii) generates a first combined digital signal comprising data bits that represent one of the power level measurements of the first analog baseband signal, and (iv) modulates a first carrier signal with the first combined digital signal so as to generate a first ultra-wideband signal carrying the first combined digital signal, and wherein the first transceiver wirelessly transmits the first ultra-wideband signal away from the remote antenna entity.

21. The remote antenna entity of claim 20,
wherein the first transceiver provides to the signal conditioner a second ultra-wideband signal received at the first transceiver,
wherein the second ultra-wideband signal carries a second combined digital signal comprising data bits representing a power level measurement of a second analog baseband signal measured at the clock rate interval,
wherein the second analog baseband signal represents digital signals for the multiple wireless communication channels,
wherein the signal conditioner recovers the second combined digital signal from the second ultra-wideband signal, modulates a second carrier signal with the second combined digital signal so as to generate a third ultra-wideband signal,
wherein the third ultra-wideband signal carries the second combined digital signal, and
wherein the first transceiver wirelessly transmits the third ultra-wideband signal away from the remote antenna entity.

22. The remote antenna entity of claim 20,
wherein the multiple wireless communication channels comprise forward-link communication channels assigned by a base transceiver station to one or more wireless communication devices, and
wherein the non-ultra-wideband signal received at the second transceiver is received from the base transceiver station.

23. The remote antenna entity of claim 20,
wherein the multiple wireless communication channels comprise reverse-link communication channels assigned by a base transceiver station to one or more wireless communication devices, and
wherein the non-ultra-wideband signal received at the second transceiver is a result of the one or more wireless communication devices transmitting the digital signals for multiple wireless communication channels via the reverse-link communication channels.

24. The remote antenna entity of claim 20, further comprising:
a housing,
wherein the first transceiver comprises an ultra-wideband antenna,
wherein the second transceiver comprises a non-ultra-wideband antenna, and
wherein the signal conditioner, at least a portion of the ultra-wideband antenna, and at least a portion of the non-ultra-wideband antenna are all located within the housing.

25. The remote antenna entity of claim 20,
wherein the remote antenna entity is located within an indoor premises, and wherein the remote antenna entity is part of a distributed antenna system that extends a cell or cell sector of a base transceiver station.

26. The remote antenna entity of claim 20, wherein the first combined digital signal further comprises a data bit that represents whether an amplitude of the first analog baseband signal is positive or negative.

27. A system comprising:
a first remote antenna entity comprising: (i) a first non-ultra-wideband transceiver, (ii) a first ultra-wideband transceiver, and (iii) a first signal conditioner connected to the first non-ultra-wideband transceiver and to the first ultra-wideband transceiver; and
a second remote antenna entity comprising: (i) a second non-ultra-wideband transceiver, (ii) a second ultra-wideband transceiver, and (iii) a second signal conditioner connected to the second non-ultra-wideband transceiver and to the second ultra-wideband transceiver,
wherein the first ultra-wideband transceiver wirelessly transmits to the second ultra-wideband transceiver a first ultra-wideband signal carrying a combined digital signal comprising data bits representing a power level measurement of a first analog baseband signal measured at a clock rate interval for an air interface protocol defining multiple wireless communication channels,
wherein the first analog baseband signal represents digital signals for the multiple wireless communication channels,
wherein the second signal conditioner: (i) receives the first ultra-wideband signal from the second ultra-wideband transceiver, (ii) recovers the combined digital signal from the first ultra-wideband signal, (iii) uses the recovered combined digital signal to generate a second analog baseband signal, wherein the second analog baseband signal represents the digital signals for the multiple wireless communication channels, and (iv) modulates a first carrier signal with the second analog baseband signal so as to generate a non-ultra-wideband signal carrying the second analog baseband signal, and
wherein the second non-ultra-wideband transceiver transmits the non-ultra-wideband signal away from the second remote antenna entity for reception at one or more wireless communication devices.

28. The system of claim 27,
wherein the first ultra-wideband signal comprises a signal selected from the group consisting of (i) a signal having a fractional bandwidth greater than 0.25, (ii) a signal that occupies 500 MHz or more of a frequency band, (iii) a signal having a −10 dB bandwidth in a frequency band between 3.1 GHz and 10.6 GHz, and (iv) a signal in a frequency band within a bandwidth designated by the Federal Communications Commission (FCC) for use by ultra-wideband signals, and
wherein the non-ultra-wideband signal comprises a signal selected from the group consisting of (i) a signal having a fractional bandwidth less than or equal to 0.25, (ii) a signal that occupies less than or equal to 500 MHz of a frequency band, (iii) a signal having a −10 dB bandwidth outside of the frequency band between 3.1 GHz and 10.6 GHz, and (iv) a signal in a frequency band within a bandwidth not designated by the FCC for use by ultra-wideband signals.

29. The system of claim 27,
wherein the first remote antenna entity further comprises a first housing, wherein the second remote antenna entity further comprises a second housing, wherein the first signal conditioner, at least a portion of the first non-ultra-wideband transceiver, and at least a portion of the first ultra-wideband transceiver are located within the first housing, and wherein the second signal conditioner, at least a portion of the second non-ultra-wideband transceiver, and at least a portion of the second ultra-wideband transceiver are located within the second housing.

30. The system of claim 29, further comprising:

a third remote antenna entity comprising: (i) a third non-ultra-wideband transceiver, (ii) a third ultra-wideband transceiver, and (iii) a third signal conditioner connected to the third non-ultra-wideband transceiver and to the third ultra-wideband transceiver, wherein the second signal conditioner modulates a second carrier signal with the recovered combined digital signal so as to generate a second ultra-wideband signal carrying the combined digital signal, wherein the second ultra-wideband transceiver transmits the second ultra-wideband signal away from the second remote antenna entity, and wherein the third ultra-wideband transceiver receives the second ultra-wideband signal.

31. The system of claim 30, wherein communication of the combined digital signal from the first remote antenna entity to the second remote antenna entity and then to the third remote antenna entity is performed as wireless daisy-chain communications.

* * * * *